US012800393B2

(12) United States Patent
Hayashi et al.

(10) Patent No.: US 12,800,393 B2
(45) Date of Patent: Nov. 17, 2026

(54) INTERFEROMETER HAVING A DRIVER TO CHANGE THE POSITION OF A RETROREFLECTOR

(71) Applicant: SEIKO EPSON CORPORATION, Tokyo (JP)

(72) Inventors: Nobuhito Hayashi, Chino (JP); Kohei Yamada, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 108 days.

(21) Appl. No.: 18/894,090

(22) Filed: Sep. 24, 2024

(65) Prior Publication Data

US 2025/0102362 A1 Mar. 27, 2025

(30) Foreign Application Priority Data

Sep. 25, 2023 (JP) ................................ 2023-161635

(51) Int. Cl.
*G01J 3/453* (2006.01)
*G01J 3/14* (2006.01)

(52) U.S. Cl.
CPC ............... *G01J 3/4535* (2013.01); *G01J 3/14* (2013.01); *G01J 3/4531* (2013.01); *G01J 2003/4538* (2013.01)

(58) Field of Classification Search
CPC .......... G01J 3/4535; G01J 3/14; G01J 3/4531; G01J 2003/4538
See application file for complete search history.

(56) References Cited

U.S. PATENT DOCUMENTS 5,638,177 A * 6/1997 Chaney .............. G01B 9/02052 356/498
6,381,015 B1 * 4/2002 Sonehara ............... G01N 21/45 356/497

(Continued)

FOREIGN PATENT DOCUMENTS

CN 202018521 U * 10/2011
JP 2022-038156 A 3/2022

(Continued)

*Primary Examiner* — Tarifur R Chowdhury
*Assistant Examiner* — Kemaya Nguyen
(74) *Attorney, Agent, or Firm* — Harness, Dickey & Pierce, P.L.C.

(57) ABSTRACT

An interferometer including an analysis optical system including a retroreflector configured to reflect analysis light and a first light receiver configured to receive the analysis light and output a first light reception signal, the analysis optical system irradiating a sample with the analysis light and causing the analysis light to interfere; a length measuring optical system including a laser light source configured to output laser light, an optical modulator configured to modulate a frequency of the laser light by using a vibrator and add a modulation component to the laser light, and a second light receiver configured to receive the laser light containing the modulation component and a length measurement component generated when the retroreflector is irradiated with the laser light and output a second light reception signal, the length measuring optical system causing the laser light to interfere; and a driver configured to change a position of the retroreflector.

11 Claims, 11 Drawing Sheets

(56) References Cited

U.S. PATENT DOCUMENTS

| | | | | |
|---|---|---|---|---|
| 6,844,936 | B2 * | 1/2005 | Dalhoff | G01B 9/02002 356/498 |
| 9,557,221 | B1 * | 1/2017 | Manning | G01J 3/453 |
| 2011/0194117 | A1 * | 8/2011 | Xie | G01J 3/02 356/452 |
| 2014/0253919 | A1 * | 9/2014 | Yui | G01B 9/02041 356/301 |
| 2017/0219482 | A1 | 8/2017 | Shirai | |
| 2020/0124480 | A1 | 4/2020 | Suzuki et al. | |
| 2022/0065614 | A1 | 3/2022 | Yamada et al. | |

FOREIGN PATENT DOCUMENTS

| | | | | |
|---|---|---|---|---|
| JP | 2022182317 | A * | 12/2022 | G02B 27/106 |
| WO | WO-2016019949 | A1 * | 2/2016 | G01B 9/02067 |
| WO | 2016/059939 | A1 | 4/2016 | |
| WO | 2019/009404 | A1 | 1/2019 | |

* cited by examiner

INTERFEROMETER HAVING A DRIVER TO CHANGE THE POSITION OF A RETROREFLECTOR

The present application is based on, and claims priority from JP Application Serial Number 2023-161635, filed Sep. 25, 2023, the disclosure of which is hereby incorporated by reference herein in its entirety.

BACKGROUND

1. Technical Field

The present disclosure relates to an interferometer.

2. Related Art

WO 2019/009404 discloses an optical module used for a spectroscopic analysis in which spectral information of light emitted or absorbed by a sample is acquired and analyzing components in the sample and other factors thereof are analyzed based on the spectral information. The optical module includes a mirror unit, a beam splitter unit, a light incident section, a first photodetector, a second light source, and a second photodetector. The mirror unit includes a movable mirror that moves in a predetermined direction and a fixed mirror the position of which is fixed. In the thus configured optical module, the beam splitter unit, the movable mirror, and the fixed mirror constitute an interference optical system that measurement light and laser light enter.

The measurement light having entered the interference optical system from a first light source via a measurement target travels via the light incident section and is split in the beam splitter unit. Part of the split measurement light is reflected off the movable mirror and returns to the beam splitter unit. The remainder of the split measurement light is reflected off the fixed mirror and returns to the beam splitter unit. The part and the remainder of the measurement light having returned to the beam splitter unit are detected as interference light by the first photodetector.

The laser light output from the second light source is split by the beam splitter unit. Part of the split laser light is reflected off the movable mirror and returns to the beam splitter unit. The remainder of the split laser light is reflected off the fixed mirror and is returned to the beam splitter unit. The part and the remainder of the laser light having returned to the beam splitter unit are detected as interference light by the second photodetector.

The thus configured optical module measures the position of the movable mirror based on the result of the detection of the interference laser light. The spectroscopic analysis of the measurement target can then be performed based on the result of the measurement of the position of the movable mirror and the result of the detection of the interference measurement light. Specifically, a waveform called an interferogram is produced by determining the intensity of the measurement light at each position of the movable mirror. Spectral information on the spectrum of the measurement target can be determined by performing Fourier transform on the interferogram. The optical module described in WO 2019/009404 is therefore used for a Fourier transform infrared spectroscopic analyzer (FTIR).

WO 2019/009404 is an example of the related art.

In the optical module described in WO 2019/009404, the movable mirror is driven by an electrostatic actuator. To increase the accuracy of the acquired spectral information, it is important that the light incident on the movable mirror and the light output therefrom are not displaced in the directions perpendicular to the light propagation direction as the movable mirror is driven, in other words, the shift of the light is small. It is therefore required to increase the translational accuracy of the movable mirror. Sufficient consideration is, however, not given to the translational accuracy of the movable mirror in the optical module described in WO 2019/009404, and there is room for improvement.

On the other hand, it is important to ensure a sufficient travel of the movable mirror in that the wavelength resolution (wave number resolution) of the acquired spectral information can be increased. To ensure a sufficient travel of the movable mirror while increasing the translational accuracy thereof, however, it is necessary to increase the size of the driver that drives the movable mirror.

An object of the present disclosure is therefore realizing an interferometer including a moving mirror that sufficiently tolerates the shift of the light produced when the moving mirror is moved with an increase in size of the driver suppressed.

SUMMARY

An interferometer according to an example to which the present disclosure is applied includes:

- an analysis optical system including a retroreflector configured to reflect analysis light and a first light receiver configured to receive the analysis light and output a first light reception signal, the analysis optical system irradiating a sample with the analysis light and causing the analysis light to interfere; a length measuring optical system including a laser light source configured to output laser light, an optical modulator configured to modulate a frequency of the laser light by using a vibrator and add a modulation component to the laser light, and a second light receiver configured to receive the laser light containing the modulation component and a length measurement component generated when the retroreflector is irradiated with the laser light and output a second light reception signal, the length measuring optical system causing the laser light to interfere; and a driver configured to change a position of the retroreflector.

DESCRIPTION OF EMBODIMENTS

Interferometers according to the present disclosure will be described below in detail based on embodiments shown in the accompanying drawings.

1. First Embodiment

An interferometer according to a first embodiment will first be described.

Figure 1:
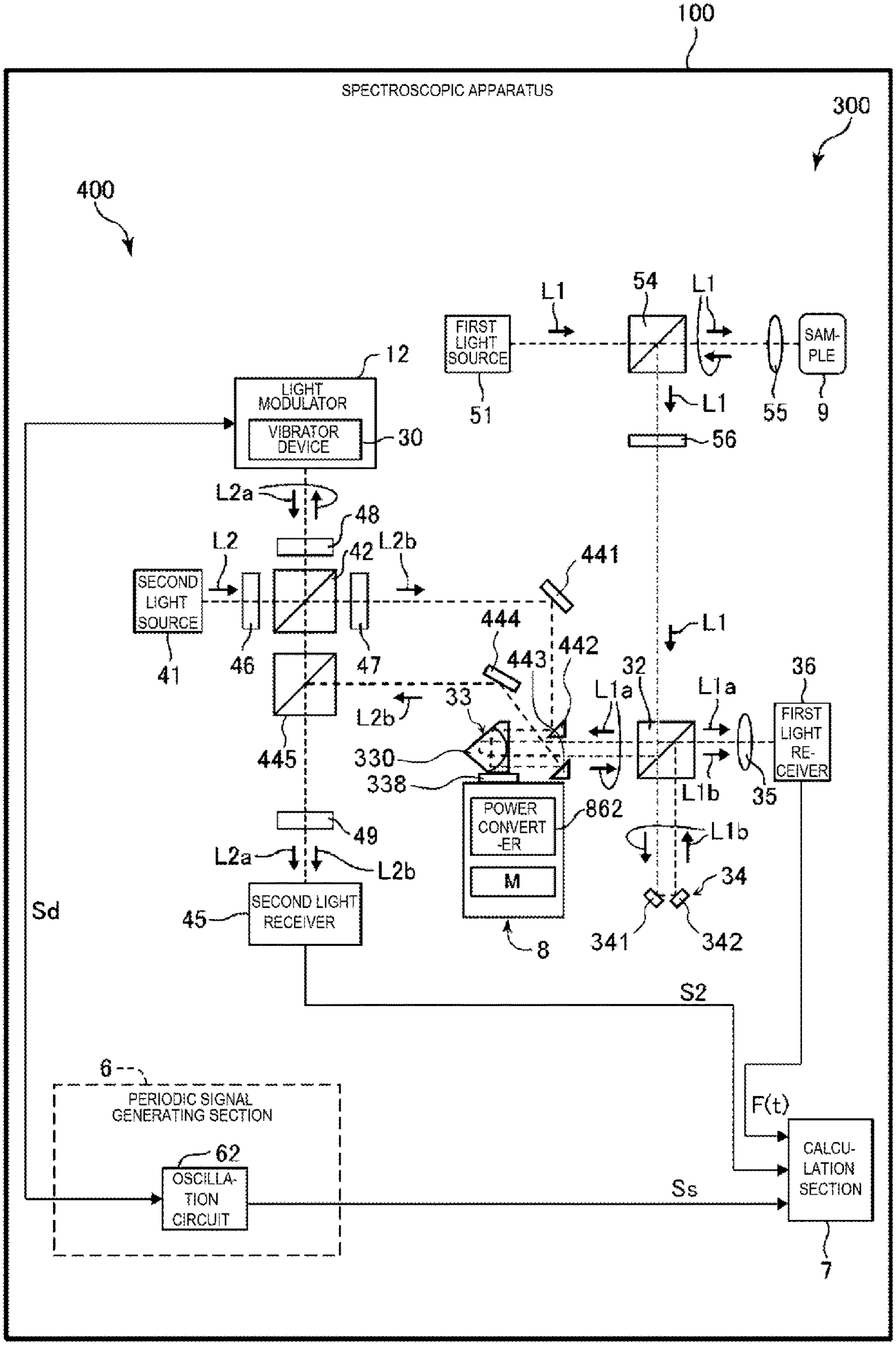
FIG. 1 is a schematic configuration diagram showing a spectroscopic apparatus as an interferometer according to a first embodiment.
Figure 2:
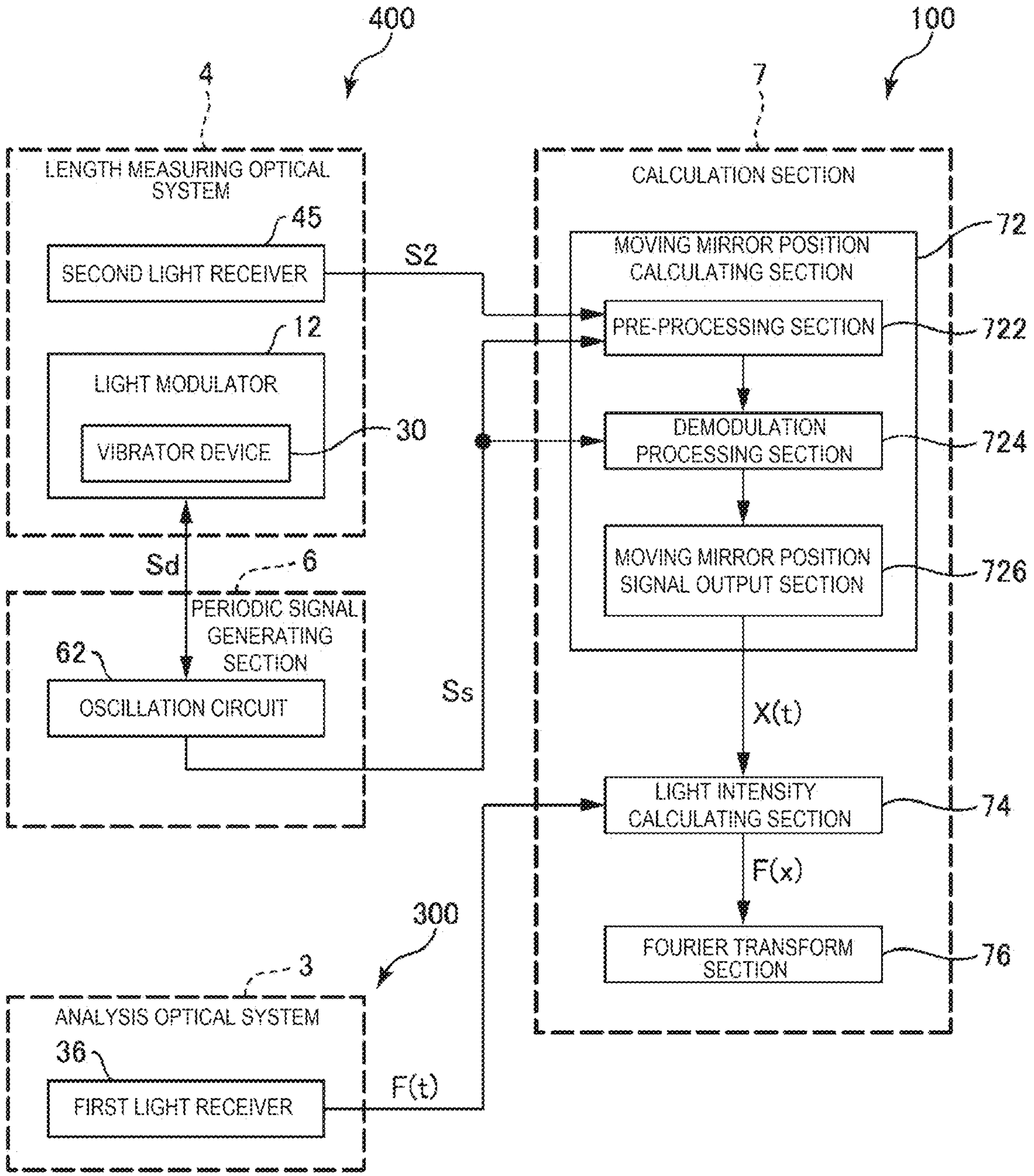
FIG. 2 is a schematic configuration diagram showing key parts of an analysis section, a length measuring section, a periodic signal generating section, and a calculation section in FIG. 1.

FIG. 1 is a schematic configuration diagram showing a spectroscopic apparatus 100 as the interferometer according to the first embodiment. FIG. 2 is a schematic configuration diagram showing key parts of an analysis section 300, a length measuring section 400, a periodic signal generating section 6, and a calculation section 7 in FIG. 1.

The spectroscopic apparatus 100 shown in FIG. 1 irradiates a sample 9 as an object under test with analysis light L1 having entered the spectroscopic apparatus 100, and causes the analysis light L1 output from the sample 9 to pass through a Michelson interference optical system. The spectroscopic apparatus 100 then detects changes in intensity of the resultant interference light while moving a moving mirror to change the optical path length inside the interference optical system, and performs calculation on the result of the detection to acquire an interferogram. The acquired interferogram is Fourier-transformed into a spectral pattern (spectral information) containing information derived from the sample 9. The spectroscopic apparatus 100 shown in FIG. 1, which selects a wavelength of the analysis light L1, is applicable, for example, to Fourier transform infrared spectroscopic analysis (FT-IR), Fourier transform near-infrared spectroscopic analysis (FT-NIR), Fourier transform visible spectroscopic analysis (FT-VIS), Fourier transform ultraviolet spectroscopic analysis (FT-UV), and Fourier transform terahertz spectroscopic analysis (FT-THz) of the sample 9.

The spectroscopic apparatus 100 includes the analysis section 300 including an analysis optical system 3 and a driver 8, the length measuring section 400 including a length measuring optical system 4, the periodic signal generating section 6, and the calculation section 7, as shown in FIG. 1.

The analysis optical system 3 performs division and mixture of the analysis light L1 while changing the optical path length of the analysis light L1 so as to be able to irradiate the sample 9 with the analysis light L1 and extract from the analysis light L1 a sample derived component derived from the sample 9. The interference of the analysis light L1 thus occurs. The length measuring optical system 4 uses length measurement light L2, which is laser light, to measure changes in the optical path length of the analysis light L1.

The periodic signal generating section 6 outputs a reference signal Ss toward the calculation section 7. The calculation section 7 determines a waveform representing the intensity of the interference light versus the optical path length, that is, the interferogram described above based on a signal representing the intensity of the interference light output from the analysis optical system 3 and a signal representing changes in the optical path length output from the length measuring optical system 4. The calculation section 7 performs Fourier transform on the interferogram to acquire a spectral pattern.

1.1. Analysis Optical System

The analysis optical system 3 includes a first light source 51, a beam splitter 54, a light collecting lens 55, and a light attenuating filter 56. Note in the analysis optical system 3 that some of the optical elements described above may be omitted, optical elements other than those described above may be provided, or the optical elements described above may be replaced by other optical elements.

The first light source 51 is a light source that outputs, for example, white light, that is, light that is the mixture of multiple kinds of light in a wide wavelength band as the analysis light L1. The wavelength band of the analysis light L1, that is, the type of the first light source 51 is selected as appropriate in accordance with the purpose of the spectroscopic analysis performed on the sample 9. When infrared-light spectroscopic analysis is performed, the first light source 51 may, for example, be a halogen lamp, an infrared lamp, or a tungsten lamp. When visible-light spectroscopic analysis is performed, the first light source 51 may, for example, be a halogen lamp. When ultraviolet-light spectroscopic analysis is performed, the first light source 51 may, for example, be a deuterium lamp or an ultraviolet light emitting diode (UV-LED).

A spectroscopic apparatus 100 capable of performing ultraviolet-light spectroscopic analysis or visible-light spectroscopic analysis can be realized by selecting a wavelength longer than or equal to 100 nm but shorter than or equal to 760 nm as the wavelength of the analysis light L1. Instead, a spectroscopic apparatus 100 capable of performing infrared-light spectroscopic analysis or near-infrared-light spectroscopic analysis can be realized by selecting a wavelength longer than or equal to 760 nm but shorter than or equal to 20 μm as the wavelength of the analysis light L1. Still instead, a spectroscopic apparatus 100 capable of performing terahertz-wave spectroscopic analysis can be realized by selecting a wavelength longer than or equal to 30 μm but shorter than or equal to 3 mm as the wavelength of the analysis light L1.

The first light source 51 may be provided outside the spectroscopic apparatus 100. In this case, the analysis light L1 output from the external first light source 51, which is provided outside the spectroscopic apparatus 100, only needs to be introduced into the spectroscopic apparatus 100. Providing the spectroscopic apparatus 100 with the first light source 51 as in the present embodiment, however, allows an increase particularly in accuracy of the alignment of the first light source 51 with the beam splitter 54, so that loss of the analysis light L1 caused by alignment failure can be minimized.

The first light source 51 may be a laser light source that outputs laser light. Using a laser light source as the first light source 51 allows realization of a spectroscopic apparatus

100 capable of performing laser excited spectroscopic analysis such as Fourier Raman spectroscopic analysis and Fourier fluorescence spectroscopic analysis of the sample 9. Note in this case that the configuration of the analysis optical system 3 may be changed from the configuration described above. In this case, a known light source used for Raman spectroscopy or fluorescence spectroscopy is used as the laser light source.

The analysis light L1 passes through the beam splitter 54, is collected by the light collecting lens 55, and is radiated to the sample 9. The analysis light L1 is reflected off the sample 9 and returns to the beam splitter 54. The configuration described above enables spectroscopic analysis based on the reflected light output from the sample 9, that is, analysis using reflection spectroscopy. Note that analysis using transmission spectroscopy can be performed by changing the optical path of the analysis optical system 3.

For example, a non-polarizing beam splitter is used as the beam splitter 54, and a polarizing beam splitter may instead be used. In this case, a necessary waveplate may be added as appropriate.

The light collecting lens 55 collects the analysis light L1 to reduce the spot size of the analysis light L1 with which the sample 9 is irradiated. Furthermore, the light collecting lens 55 collects the diffused light output from the sample 9. Local analysis can thus be performed. When the local analysis is unnecessary, the light collecting lens 55 may be omitted.

The analysis light L1 output from the sample 9 contains a sample derived component generated by the analysis light L1 acting on the sample 9. The sample derived component is a component generated by the analysis light L1 acting on the sample 9, and examples of the action performed by the sample 9 may include absorption, reflection, scattering, and emission of light having a specific wavelength. The analysis light L1 travels via the light collecting lens 55, is reflected off the beam splitter 54, and passes through the light attenuating filter 56. The light attenuating filter 56 selectively attenuates light having predetermined wavelengths. The S/N ratio (signal-to-noise ratio) of the sample derived component can thus be increased, so that the spectroscopic analysis can be performed with increased accuracy. The light attenuating filter 56 is, for example, a notch filter having an optical density (OD value) greater than or equal to 6.0.

The analysis optical system 3 includes a beam splitter 32 (light divider), a moving mirror 33 (retroreflector), a fixed mirror 34 (fixed reflector), a light collecting lens 35, and a first light receiver 36, which constitute the Michelson interference optical system. Note in the analysis optical system 3 that some of the optical elements described above may be omitted, optical elements other than those described above may be provided, or the optical elements described above may be replaced by other optical elements.

The beam splitter 32 is a non-polarizing beam splitter that splits the analysis light L1 into two parts, analysis light L1*a* and analysis light L1*b*. Specifically, the beam splitter 32 splits the analysis light L1 into the two parts by reflecting part of the analysis light L1 toward the moving mirror 33 as the analysis light L1*a* and transmitting the other part of the analysis light L1 toward the fixed mirror 34 as the analysis light L1*b*.

Examples of the type of the beam splitter 32 may include a plate-shaped element and a stacked element in addition to a prism-shaped element (cubic element) shown in FIG. 1. Since the plate-shaped beam splitter 32 causes wavelength dispersion between the analysis light L1*a* and the analysis light L1*b*, a wavelength dispersion compensator may be disposed between the beam splitter 32 and the fixed mirror 34 as required. The wavelength dispersion compensator is an optical element that compensates for wavelength dispersion caused by an optical path length difference between glass materials. In the present embodiment, since a prism-shaped element is used as the beam splitter 32, no wavelength dispersion compensator is necessary. The prism-shaped element is an element having a form in which an optical thin film is sandwiched between prisms. The stacked element is an element having a form in which an optical thin film is sandwiched between two transparent planar plates. The stacked element can also eliminate the need for the wavelength dispersion compensator, as the prism-shaped element. The prism-shaped element and the stacked element, in which the optical thin film is not exposed, allow enhancement of the long-term reliability of the beam splitter 32.

The beam splitter 32 transmits the analysis light L1*a* reflected off the moving mirror 33 toward the first light receiver 36, and reflects the analysis light L1*b* reflected off the fixed mirror 34 toward the first light receiver 36. The beam splitter 32 therefore mixes the analysis light L1*a* and the analysis light L1*b*, into which the analysis light L1 has been split, with each other.

The moving mirror 33 is a mirror that is moved relative to the beam splitter 32 in the direction in which the analysis light L1*a* is incident on the moving mirror 33, and reflects the analysis light L1*a*. The moving mirror 33 is moved by the driver 8 back and forth in the direction described above, in which the analysis light L1*a* is incident on the moving mirror 33. The phase of the analysis light L1*a* reflected off the moving mirror 33 changes in accordance with the position of the moving mirror 33. The moving mirror 33 thus adds phase information derived from the position of the moving mirror 33 to the analysis light L1*a*. The phase information derived from the position of the moving mirror 33 is a change in phase added to the analysis light L1*a* in accordance with the position of the moving mirror 33.

The moving mirror 33 (retroreflector) includes a corner cube prism 330. The corner cube prism 330 is also called a retroreflector prism, and has the function of retro-reflecting light incident thereon at angles of incidence within a predetermined range to return the light in the light incident direction. In the present specification, such a function is referred to as "retro-reflectivity". An optical element having retro-reflectivity used as the moving mirror 33 can increase the tolerance to the shift produced when the moving mirror 33 is moved as compared with a case in which a planar mirror is used as the moving mirror 33. That is, even when an angular deviation (angle of deviation) occurs due to the shift produced when the moving mirror 33 is moved, the effect of the angular deviation can be reduced, so that the effect on the result of the analysis can be suppressed. When a planar mirror is used, retroreflection occurs only when the angle of incidence of the light incident on the planar mirror is 0°, but when an optical element having retro-reflectivity such as the corner cube prism 330 is used, retroreflection occurs even when the angle of incidence is greater than 0°.

The corner cube prism 330 retro-reflects the analysis light L1*a* and returns the analysis light L1*a* to the beam splitter 32 along a light exiting path parallel to the light incident path. In addition, the light exiting path does not change in virtue of the retro-reflectivity even when a shift of the light is produced by the movement of the moving mirror 33. Utilizing the advantageous characteristic described above allows the state of the mixture of the analysis light L1*a* and the analysis light L1*b* in the beam splitter 32 to be maintained constant. As a result, when the S/N ratio of an interference signal representing the interference between the analysis light L1*a* and the analysis light L1*b* decreases due to the shift thereof produced when the moving mirror 33 is moved, the decrease can be suppressed, so that the effect of the decrease on the result of the analysis can be suppressed. The corner cube prism 330 will be described later in detail.

In addition, since the tolerance to the shift produced when the moving mirror 33 is moved, the priority of the accuracy at which the driver 8 drives the moving mirror 33 can be lowered. A compact driver 8 can therefore be used even when a sufficient travel of the moving mirror 33 driven by the driver 8 is ensured. The spectroscopic apparatus 100 can thus be reduced in terms of size, weight, and cost.

The fixed mirror 34 is a mirror that is located at a fixed position with respect to the beam splitter 32 and reflects the analysis light L1*b*. The analysis light L1*b* reflected off the fixed mirror 34 is mixed with the analysis light L1*a* by the beam splitter 32, and the mixture of the analysis light L1*a* and the analysis light L1*b* is received by the first light receiver 36 as the interference light. In the analysis optical system 3, an optical path difference occurs between the optical path of the analysis light L1*a* and the optical path of the analysis light L1*b* in accordance with the position of the moving mirror 33. The fixed mirror 34 may be a planar mirror, a corner cube prism, or a corner cube mirror. The fixed mirror 34 shown in FIG. 1 is configured with a roof mirror that is the combination of two planar mirrors 341 and 342. Using a corner cube prism, a corner cube mirror, a roof mirror, or any other element having retro-reflectivity as the fixed mirror 34 allows suppression of a decrease in the S/N ratio of the interference signal due to an angular deviation (angle of deviation) of the arrangement of the fixed mirror 34, so that an effect on the result of the analysis can be suppressed.

The light collection lens 35 collects the interference light, that is, the mixture of the analysis light L1*a* and the analysis light L1*b*, at the first light receiver 36. The light collection lens 35 may be omitted depending on the area of the light receiving portion of the first light receiver 36.

The first receiver 36 receives the interference light and acquires the intensity thereof. A signal indicating a temporal change in the intensity is output as a first light reception signal F(t). The first light reception signal F(t) contains the sample derived component generated by the interaction between the analysis light L1 and the sample 9 and the phase information derived from the position of the moving mirror 33 described above.

Examples of the first light receiver 36 may include a photodiode, a phototransistor, and a photomultiplier tube (PMT). Among the elements described above, examples of the photodiode may include an InGaAs-based photodiode, a Si-based photodiode, and an avalanche photodiode.

1.2. Length Measuring Optical System

The length measuring optical system 4 is a Michelson interference optical system and includes a second light source 41, a beam splitter 42, a light modulator 12, a second light receiver 45, a half waveplate 46, a half waveplate 47, a quarter waveplate 48, an analyzer 49, optical path changing mirrors 441, 442, 443, and 444, and a beam splitter 445. Note in the length measuring optical system 4 that some of the optical elements described above may be omitted, optical elements other than those described above may be provided, or the optical elements described above may be replaced with other optical elements. The length measuring optical system 4 uses optical heterodyne interferometry to output the phase information derived from the position of the moving mirror 33 and frequency information derived from the moving speed of the moving mirror 33 to the calculation section 7. In the present specification, the two types of information described above are referred to as a "length measurement component".

The second light source 41 is preferably a light source that outputs light having a narrow spectral linewidth. Examples of the second light source 41 may include a gas laser such as a He—Ne laser and an Ar laser; a semiconductor laser device such as a distributed feedback laser diode (DFB-LD), a fiber Bragg grating laser diode (FBG-LD), a vertical cavity surface emitting laser (VCSEL), and a Fabry-Perot laser diode (FP-LD); and a crystal laser such as an yttrium aluminum garnet (YAG) laser.

It is particularly preferable that the second light source 41 is a semiconductor laser device. The spectroscopic apparatus 100 can thus be reduced in size, weight, and power consumption.

The beam splitter 42 is a polarizing beam splitter that transmits P-polarized light and reflects S-polarized light. The half waveplate 46 is disposed with the optical axis thereof rotated with respect to the polarization axis of the length measurement light L2. Therefore, when the length measurement light L2 passes through the half waveplate 46, the length measurement light L2 becomes linearly polarized light containing P-polarized light and S-polarized light, and is divided by the beam splitter 42 into two parts, the P-polarized light and the S-polarized light.

Length measurement light L2*a*, which is S-polarized light, is converted into circularly polarized light by the quarter waveplate 48 and is incident on the light modulator 12. The light modulator 12 reflects the length measurement light L2*a* to add a modulation component to the length measurement light L2*a*. The modulation component is a change in frequency that occurs when the length measurement light L2*a* is reflected off a vibrator 30. The reflected length measurement light L2*a* returns to the beam splitter 42. At this point of time, the length measurement light L2*a* is converted into P-polarized light by the quarter waveplate 48.

The length measurement light L2*b*, which is the P-polarized light, is converted into S-polarized light by the half waveplate 47, and is incident on the moving mirror 33 via the optical path changing mirrors 441 and 442. The length measurement light L2*b* is guided by the optical path changing mirrors 441 and 442 and is incident on the same light incident surface of the moving mirror 33 on which the analysis light L1*a* is incident. The moving mirror 33 reflects the length measurement light L2*b*. The phase of the length measurement light L2*b* thus changes in accordance with the position of the moving mirror 33. The length measurement light L2*b* reflected off the moving mirror 33 enters the beam splitter 445 via the optical path changing mirrors 443 and 444.

In the present embodiment, the analysis light L1*a* and the length measurement light L2*b* are incident on the same incident surface of the moving mirror 33, as described above. In this case, the phase information added to the analysis light L1*a* and the phase information added to the length measurement light L2*b* are information derived from the position of the same reflection surface of the moving mirror 33. The two pieces of phase information can thus be further associated with each other, so that the accuracy of the final result of the analysis can be increased.

The beam splitter 42 transmits the length measurement light L2*a* having returned from the light modulator 12 toward the beam splitter 445. The beam splitter 445 is a polarizing beam splitter, and mixes the length measurement light L2*a* output from the beam splitter 42 and the length measurement light L2*b* reflected off the moving mirror 33 with each other. The mixture of the length measurement light L2*a* and the length measurement light L2*b* passes through the analyzer 49 and enters the second light receiver 45.

The light modulator 12 may, for example, be the light modulator disclosed, in JP-A-2022-038156. In the present embodiment, the light modulator 12 includes the vibrator 30. The vibrator 30 vibrates in response to a device drive signal Sd and reflects the length measurement light L2*a*. The light modulator 12 thus superimposes the modulation component on the length measurement light L2*a*.

Examples of the vibrator 30 may include a quartz crystal vibrator, a silicon vibrator, and a ceramic vibrator. The vibrators described above are those utilizing a mechanical resonance phenomenon, and therefore have a high Q-value and can readily stabilize the natural frequency. The S/N ratio of the modulation component to be applied by the light modulator 12 to the length measurement light L2*a* can therefore be increased, so that the accuracy of the reference signal Ss can be increased. As a result, the position of the moving mirror 33 can be accurately determined, so that a spectroscopic apparatus 100 capable of generating a spectral pattern having a highly accurate wavelength axis (wave number axis) can be eventually realized.

Examples of the quartz crystal vibrator may include a quartz crystal AT vibrator, an SC-cut quartz crystal vibrator, a tuning-fork-type quartz crystal vibrator, and a quartz crystal surface acoustic wave element. The oscillation frequency of the quartz crystal vibrators ranges, for example, from about 1 kilohertz to several hundreds of megahertz.

The silicon vibrator is a vibrator including a single-crystal silicon element manufactured from a single-crystal silicon substrate using a MEMS technology and a piezoelectric film. MEMS (micro-electro-mechanical systems) means micro-electromechanical systems. The single-crystal silicon element may, for example, have the shape of a cantilever, such as a two-leg tuning fork and a three-leg tuning fork, and the shape of a beam clamped at opposite ends. The oscillation frequency of the silicon vibrator ranges, for example, from about 1 kilohertz to several hundreds of megahertz.

The ceramic vibrator is a vibrator including electrodes and a piezoelectric ceramic element manufactured by sintering a piezoelectric ceramic material. Examples of the piezoelectric ceramic material may include lead zirconate titanate (PZT) and barium titanate (BTO). The oscillation frequency of the ceramic vibrator ranges, for example, from about several hundreds of kilohertz to several tens of megahertz.

Figure 3:
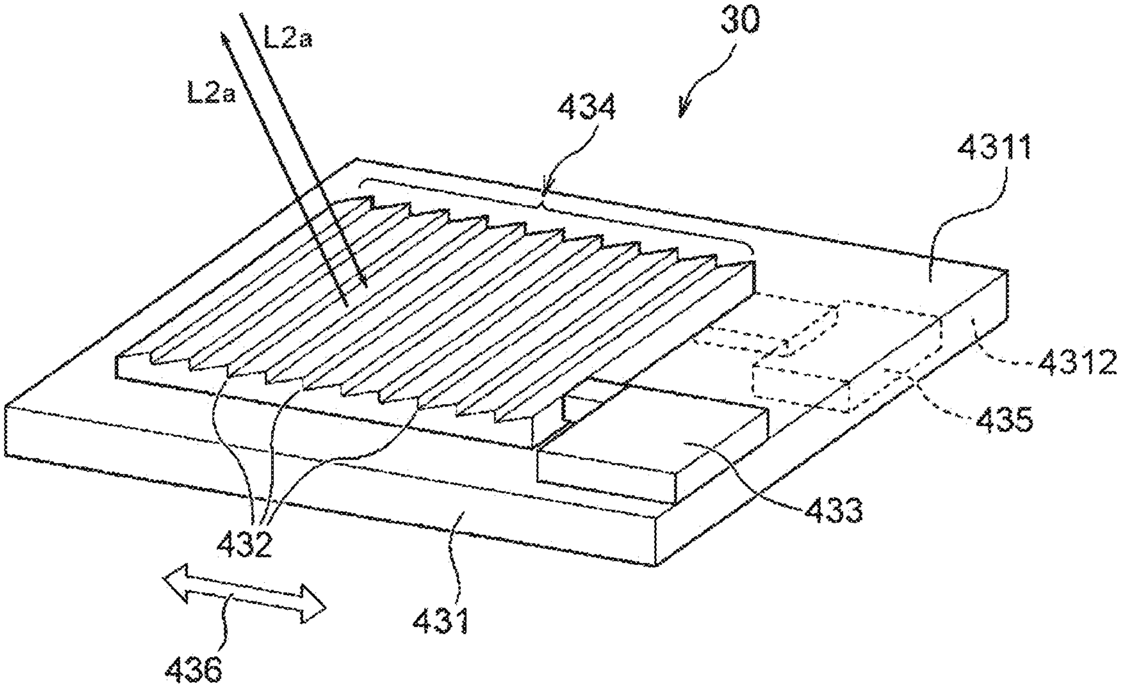
FIG. 3 is a perspective view showing an example of the configuration of a vibrator shown in FIG. 1.

FIG. 3 is a perspective view showing an example of the configuration of the vibrator 30 shown in FIG. 1.

The vibrator 30 shown in FIG. 3 includes a plate-shaped vibrator element 431 and a diffraction grating 434 provided at the vibrator element 431.

The vibrator element 431 is made of a material that repeats a mode in which the vibrator element 431, when an electric potential is applied thereto, vibrates so as to be distorted in an in-plane direction. The vibrator element 431 shown in FIG. 3 is a quartz crystal AT vibrator that makes thickness shear vibration along a vibration direction 436 in a high-frequency region in a megahertz band. The diffraction grating 434 is provided at a surface of the vibrator element 431. The diffraction grating 434 has grooves 432 having a component that intersects with the vibration direction 436, that is, multiple linear grooves 432 extending in a direction that intersects with the vibration direction 436.

The vibrator element 431 has a front surface 4311 and a rear surface 4312 facing away from each other. The diffraction grating 434 is disposed at the front surface 4311. The front surface 4311 is further provided with a pad 433 used to apply an electric potential to the vibrator element 431. The rear surface 4312 is also provided with a pad 435 used to apply an electric potential to the vibrator element 431.

The vibrator element 431 is so sized that the length of the long sides is, for example, greater than or equal to about 0.50 mm but smaller than or equal to about 10.0 mm. The thickness of the vibrator element 431 is, for example, greater than or equal to about 0.10 mm but smaller than or equal to about 2.0 mm. As an example, the vibrator element 431 has a square shape each side of which is 1.6 mm long, and has a thickness of 0.35 mm.

The long sides of the diffraction grating 434 has a size, for example, greater than or equal to about 0.20 mm but smaller than or equal to about 3.0 mm. The thickness of the diffraction grating 434 is, for example, greater than or equal to about 0.003 mm but smaller than or equal to about 0.50 mm.

In the present embodiment, the vibrator element 431 makes thickness-shear vibration, and the vibration is an in-plane vibration as shown in FIG. 3 in the form of the vibration direction 436, so that the light cannot be modulated even when the light is incident perpendicularly on the front surface of the vibrator element 431. In view of the fact described above, the vibrator 30 enables the light modulation by employing the configuration in which the vibrator element 431 is provided with the diffraction grating 434.

The diffraction grating 434 shown in FIG. 3 is, for example, a blazed diffraction grating. The blazed diffraction grating is a diffraction grating having a stepwise cross-sectional shape. It should be noted that the diffraction grating 434 does not necessarily have the shape described above.

Figure 4:
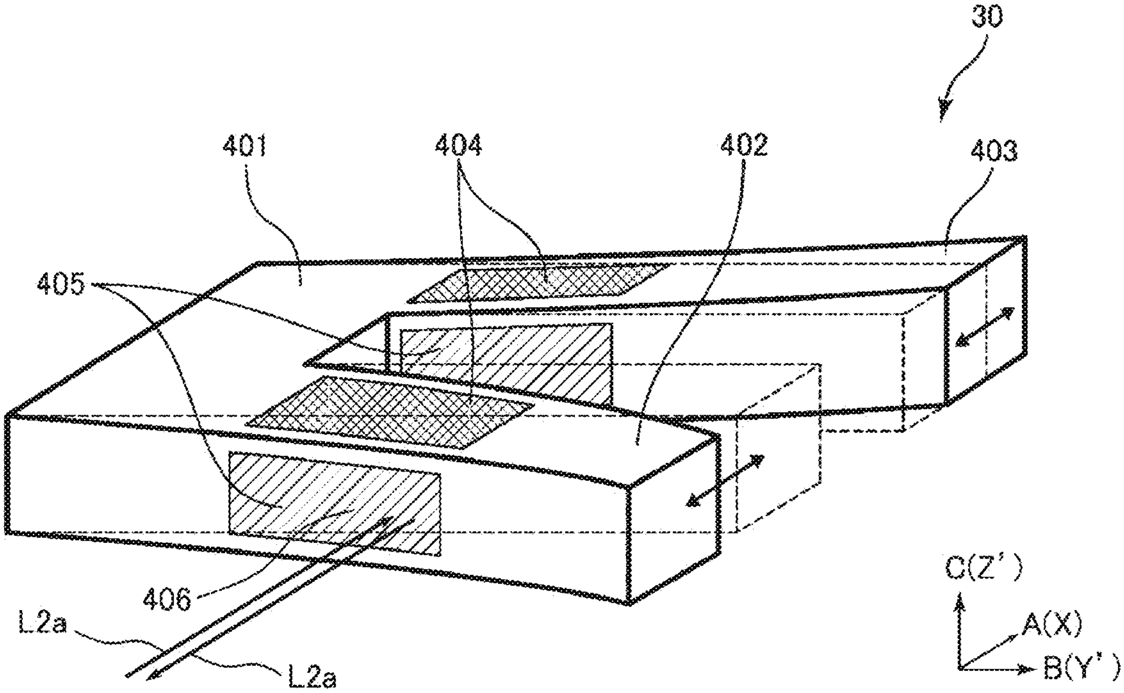
FIG. 4 is a perspective view showing another example of the configuration of the vibrator shown in FIG. 1.

FIG. 4 is a perspective view showing another example of the configuration of the vibrator 30 shown in FIG. 1. It should be noted in FIG. 4 that an A-axis, a B-axis, and a C-axis are set as three axes perpendicular to each other, and are indicated by arrows. It is assumed that the tip of each of the arrows is defined as a "positive side", and the base end of the arrow is defined as a "negative side". Furthermore, for example, the directions toward the positive side and the negative side of the A-axis are each referred to as an "A-axis direction". A B-axis direction and a C-axis direction are defined in the same manner.

The vibrator 30 shown in FIG. 4 is a tuning-fork-type quartz crystal vibrator. The vibrator 30 shown in FIG. 4 includes a vibration substrate including a base 401, a first vibrating arm 402, and a second vibrating arm 403. Such a tuning-fork-type quartz crystal vibrator is readily available and produces stable oscillation since a technology for manufacturing the vibrator has been established. The tuning-fork-type quartz crystal vibrator is therefore suitable as the vibrator 30. The vibrator 30 further includes electrodes 404 and 405 and light reflecting surfaces 406 each provided as a part of the vibration substrate.

The base 401 is a portion extending along the A-axis. The first vibrating arm 402 is a portion extending from an end portion of the base 401 at the negative side of the A-axis toward the positive side of the B-axis. The second vibrating arm 403 is a portion extending from an end portion of the base 401 at the positive side of the A-axis toward the positive side of the B-axis.

The electrodes 404 are electrically conductive films provided at side surfaces of the first vibrating arm 402 and the second vibrating arm 403 that are side surfaces parallel to the A-B plane. Although not shown in FIG. 4, the electrodes 404 are provided at side surfaces facing each other, and drive the first vibrating arm 402 and the second vibrating arm 403 when voltages having polarities different from each other are applied to the electrodes 404.

The electrodes 405 are electrically conductive films provided at side surfaces of the first vibrating arm 402 and the second vibrating arm 403 that are side surfaces intersecting with the A-B plane. Although not shown in FIG. 4, the electrodes 405 are also provided at side surfaces facing each other, and drive the first vibrating arm 402 and the second vibrating arm 403 when voltages having polarities different from each other are applied to the electrodes 405.

The light reflecting surfaces 406 are set at side surfaces of the first vibrating arm 402 and the second vibrating arm 403 that are side surfaces intersecting with the A-B plane, and have the function of reflecting the length measurement light L2*a*. The side surfaces refer to surfaces extending along the direction in which the first vibrating arm 402 and the second vibrating arm 403 extend. The light reflecting surface 406 shown in FIG. 4 is set particularly at the surface of the electrode 405 out of the side surfaces of the first vibrating arm 402. The electrode 405 provided at the first vibrating arm 402 also has the function as the light reflecting surface 406. It should be noted that a light reflecting film that is not shown may be provided separately from the electrode 405.

The tuning-fork-type quartz crystal vibrator is configured with a quartz crystal element cut from a quartz crystal substrate. The quartz crystal substrate used to manufacture the tuning-fork-type quartz crystal vibrator may, for example, be a quartz crystal Z-cut planar plate. An X-axis parallel to the A-axis, a Y'-axis parallel to the B-axis, and a Z'-axis parallel to the C-axis are set in FIG. 4. The quartz crystal Z-cut planar plate is, for example, a substrate so cut from a quartz single crystal that the X-axis is the electrical axis, the Y'-axis is the mechanical axis, and the Z'-axis is the optical axis. Specifically, in an orthogonal coordinate system including the X-axis, the Y'-axis and the Z'-axis, a substrate having a principal surface inclining with respect to the X-Y' plane containing the X-axis and the Y'-axis by about 1° to 5° in a counterclockwise direction around the X-axis is cut from the quartz single crystal and is preferably used as the quartz crystal substrate. The thus produced quartz crystal substrate is then etched into a quartz crystal element to be used as the vibrator 30 shown in FIG. 4. The etching may be either wet etching or dry etching.

The light reflecting surface 406 may instead be set at the surface of the electrode 404. In this case, the signals to be applied to the electrodes may be so adjusted that the tuning-fork-type quartz crystal vibrator performs out-of-plane vibration, specifically, operates in an out-of-plane vibration mode (including spurious component).

The second light receiver 45 receives the mixture of the length measurement light L2*a* and the length measurement light L2*b* as the interference light, and acquires the intensity thereof. A signal indicating the temporal change in the intensity is then output as a second light reception signal S2. The second light reception signal S2 contains a length measurement component derived from the position of the moving mirror 33.

Examples of the second light receiver 45 may include a photodiode and a phototransistor.

The optical elements provided in each of the optical systems have been described above, and it is preferable that an antireflection treatment is applied to an optical element that needs to receive light. The S/N ratios of the first light reception signal F(t) and the second light reception signal S2 can thus be increased.

1.3. Periodic Signal Generating Section

The periodic signal generating section 6 shown in FIG. 2 generates a periodic signal and outputs the periodic signal as the reference signal Ss. In the present embodiment, the periodic signal generating section 6 includes an oscillation circuit 62.

The oscillation circuit 62 may, for example, be the oscillation circuit disclosed in JP-A-2022-038156. In the oscillation circuit 62, the vibrator 30 operates as a signal source and generates a highly accurate periodic signal. The oscillation circuit 62 thus outputs a highly accurate device drive signal Sd and reference signal Ss. The device drive signal Sd and the reference signal Ss are therefore affected in the same manner when being subjected to a disturbance. As a result, the modulation component added via the vibrator 30 driven by the device drive signal Sd, and the reference signal Ss are also affected in the same manner. Therefore, when the second light reception signal S2 and the reference signal Ss are subjected to the calculation in the calculation section 7, the effects of the disturbance contained in the two signals can be canceled out or reduced in the course of the calculation. As a result, the calculation section 7 can determine the position of the moving mirror 33 with high accuracy even under the disturbance.

It should be noted that the oscillation circuit disclosed in JP-A-2022-038156 is a circuit using an inverter IC, and may instead be a Colpitts oscillation circuit.

1.4. Driver

The driver 8 shown in FIG. 1 includes a motor M and a power converter 862. The motor M generates a rotational output, and the power converter 862 converts the rotational output into linear motion to drive the moving mirror 33.

The motor M generates a rotational output in a predetermined rotational direction and at a predetermined rotational speed. Examples of the motor M may include a stepper motor, a brushless motor, and an ultrasonic (piezoelectric) motor.

The power converter 862 converts the rotational output into linear motion. When the motor M generates a linear output, the power converter 862 may be omitted. The power converter 862 may, for example, be a mechanism including a variety of gears and a linear guide. Such a mechanism can readily increase the travel of a driven object as compared, for example, with a MEMS (micro-electromechanical systems) mechanism. The wavelength resolution (wave number resolution) of an acquirable spectral pattern can therefore be readily increased. Furthermore, using the linear guide allows an increase in the translational accuracy of the moving mirror 33. The term "translational accuracy" refers to a linearly moving characteristic of the moving mirror 33 with a change in the posture thereof minimized.

1.5. Calculation Section

The calculation section 7 shown in FIG. 2 includes a moving mirror position calculating section 72, a light intensity calculating section 74, and a Fourier transform section 76. The functions provided by the functional sections described above are realized by hardware including, for example, a processor, a memory, an external interface, an input section, and a display section. The functions are specifically realized by the processor reading and executing a program stored in the memory. It should be noted that the elements described above are capable of communicating with each other via an external bus.

Examples of the processor may include a central processing unit (CPU) and a digital signal processor (DSP). It should be noted that the scheme in which any of the processors described above executes software may be replace with a scheme in which a field-programmable gate array (FPGA), an application-specific integrated circuit (ASIC), or the like realizes the functions described above.

Examples of the memory may include a hard disk drive (HDD), a solid-state drive (SSD), an electrically erasable programmable read-only memory (EEPROM), a read-only memory (ROM), and a random access memory (RAM).

Examples of the external interface may include a digital input and output port such as a universal serial bus (USB) and an Ethernet (registered trademark) port.

Examples of the input section may include a variety of input devices such as a keyboard, a mouse, a touch panel, and a touchpad. Examples of the display section may include a liquid crystal display panel and an organic electro-luminescence (EL) display panel. The input section and the display section may be provided as required, and may be omitted.

1.5.1. Moving Mirror Position Calculating Section

The moving mirror position calculating section 72 shown in FIG. 2 identifies the position of the moving mirror 33 by using optical heterodyne interferometry, and generates a moving mirror position signal X(t) based on the result of the identification. Specifically, since the length measuring optical system 4 includes the light modulator 12, a modulation component can be added to the length measurement light L2*a*. When the length measurement light L2*a* and the length measurement light L2*b* are caused to interfere with each other, the length measurement component derived from the position of the moving mirror 33 can be acquired from the resultant interference light with high accuracy. The calculation section 7 can then determine the moving mirror position signal X(t) with high accuracy based on the length measurement component. According to the optical heterodyne interferometry, extraction of the length measurement component is less susceptible to the effect of disturbance, in particular, the effect of stray light having frequencies that form noise, so that the length measurement component has high robustness.

The moving mirror position calculating section 72 shown in FIG. 2 includes a pre-processing section 722, a demodulation processing section 724, and a moving mirror position signal output section 726. The pre-processing section 722 and the demodulation processing section 724 may, for example, be the pre-processing section and the demodulation section disclosed in JP-A-2022-038156.

The pre-processing section 722 performs pre-processing on the second light reception signal S2 based on the reference signal Ss. The demodulation processing section 724 demodulates the pre-processed signal output from the pre-processing section 722 to provide the length measurement component derived from the position of the moving mirror 33 based on the reference signal Ss. That is, the demodulation processing section 724 performs demodulation to provide the length measurement component based on the reference signal Ss, which is the periodic signal generated by the periodic signal generating section 6, and the second light reception signal S2.

The moving mirror position signal output section 726 generates the moving mirror position signal X(t) based on the length measurement component derived from the moving mirror 33 and provided by the demodulation performed by the demodulation processing section 724, and outputs the generated moving mirror position signal X(t). The moving mirror position signal X(t) determined by the method described above is a signal representing the time-variant position of the moving mirror 33, and captures the displacement of the moving mirror 33 at intervals sufficiently shorter than the wavelength of the length measurement light L2. When the wavelength of the length measurement light L2 is, for example, several hundreds of nanometers, the positional resolution of the moving mirror position signal X(t) smaller than 10 nm is achievable. The light intensity calculating section 74 can therefore generate highly accurate digital data on an interferogram F(x).

Figure 5:
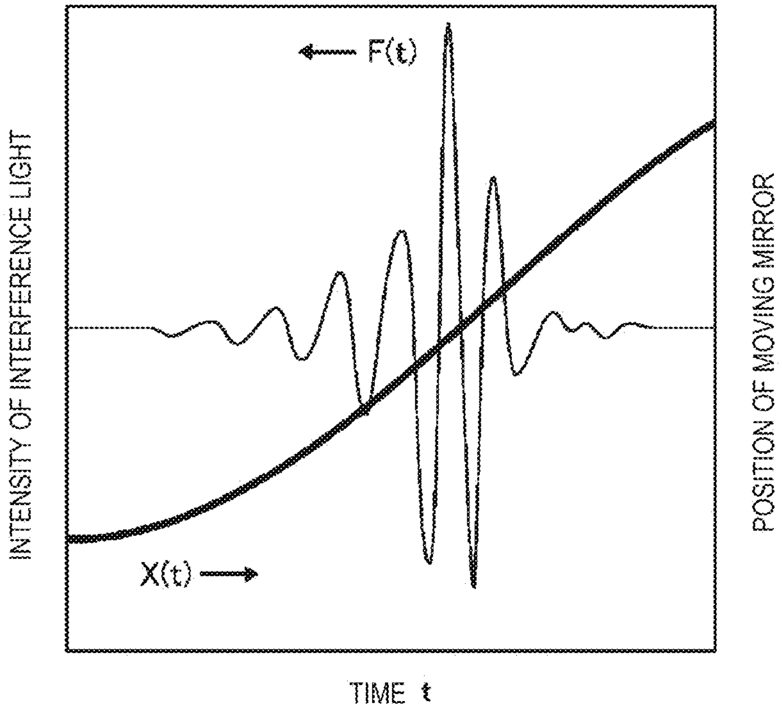
FIG. 5 shows an example of a first light reception signal and a moving mirror position signal acquired in the spectroscopic apparatus shown in FIG. 1.

FIG. 5 shows an example of the first light reception signal F(t) and the moving mirror position signal X(t) acquired in the spectroscopic apparatus 100 shown in FIG. 1. In FIG. 5, the horizontal axis represents time t, and the vertical axis represents the intensity of the interference light incident on the first light receiver 36 or the position of the moving mirror 33.

The moving mirror position signal X(t) shown in FIG. 5 is a signal produced by continuously detecting changes in the position of the moving mirror 33 and having a high positional resolution. Generating the interferogram F(x) based on the moving mirror position signal X(t) thus allows the interferogram F(x) to have a large number of data points. A large number of data points means that the interferogram F(x) is produced at a short sampling interval and hence has high accuracy. Using the thus produced interferogram F(x) therefore allows eventual acquisition of a spectral pattern having a high wavelength resolution (wave number resolution).

Furthermore, since the sampling interval can be shortened, an interferogram F(x) having a sufficient number of data points can be produced even when the analysis light L1 having a shorter wavelength (having a greater wave number) is used. A spectral pattern over a wider wavelength range (wider wave number range), that is, a spectral pattern over a wider band can thus be acquired.

1.5.2. Light Intensity Calculating Section

The light intensity calculating section 74 generates, based on the first light reception signal F(t) and the moving mirror position signal X(t), a waveform (interferogram F(x)) representing the intensity of the interference light versus the position of the moving mirror 33.

The first light reception signal F(t) contains the sample derived component and the phase information derived from the moving mirror 33, as described above. The light intensity calculating section 74 extracts the intensity of the first light reception signal F(t) based on the moving mirror position signal X(t). The light intensity calculating section 74 then generates the interferogram F(x) based on the position of the moving mirror 33, which is determined from the moving mirror position signal X(t), and the intensity of the first light reception signal F(t). It should be noted that the interferogram F(x) is expressed by a function of an optical path difference between the light reflected off the moving mirror 33 and the light reflected off the fixed mirror 34 in the analysis optical system 3 and the intensity of the interference light received by the first light receiver 36 (intensity of first light reception signal F(t)).

Figure 6:
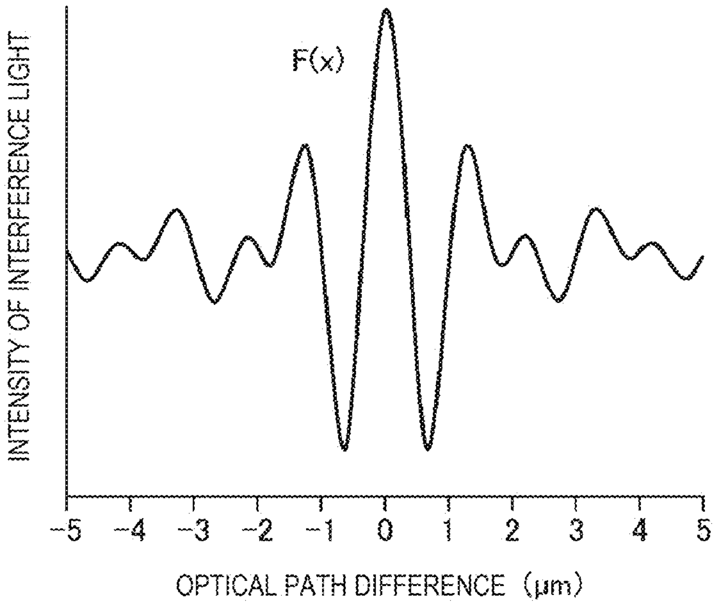
FIG. 6 shows an example of an interferogram.

FIG. 6 shows an example of the interferogram F(x). In FIG. 6, the horizontal axis represents the optical path difference in the analysis optical system 3, and the vertical axis represents the intensity of the interference light. The optical path difference in the analysis optical system 3 is a difference between the optical path length between the beam splitter 32 and the moving mirror 33 and the optical path length between the beam splitter 32 and the fixed mirror 34, and the origin of the horizontal axis of FIG. 6 is the point where the optical path difference is zero.

1.5.3. Fourier Transform Section

The Fourier transform section 76 performs Fourier transform on the interferogram F(x). A spectral pattern containing information unique to the sample 9 is thus acquired.

Figure 7:
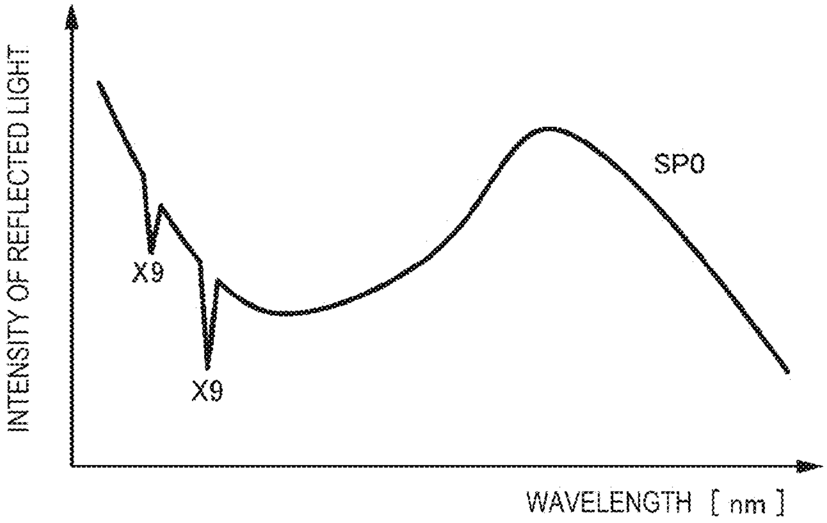
FIG. 7 is an example of a spectral pattern produced by performing spectroscopic analysis on a sample.

FIG. 7 is an example of a spectral pattern SP0 produced by performing the spectroscopic analysis on the sample 9. The spectral pattern SP0 is an example of a reflection spectrum of the sample 9.

The spectral pattern SP0 shown in FIG. 7 reflects the sample derived component generated by the analysis light L1 acting on the sample 9 and expressed in the form of absorption peaks X9. The spectroscopic apparatus 100 can analyze the characteristics of the sample 9, for example, the material, the structure, and the amounts of the components thereof based on the spectral pattern SP0.

The spectral pattern SP0 is generated by performing Fourier transform on the interferogram F(x). Since the interferogram F(x) is an electric field amplitude waveform produced by using the position of the moving mirror 33 as a parameter, the spectral pattern SP0 produced by performing Fourier transform on the interferogram F(x) has wavelength information. The position of the moving mirror 33 is directly linked to the accuracy of the wave number of the spectral pattern SP0. The spectroscopic apparatus 100 according to the present embodiment, which can determine the position of the moving mirror 33 more accurately, can therefore generate the spectrum pattern SP0 having a highly accurate wavelength axis (wave number axis). In addition, the present embodiment can suppress a decrease in the S/N ratio of the signal representing the interference between the analysis light L1*a* and the analysis light Lib due to the shift thereof produced when the moving mirror 33 is moved, and can therefore suppress the effect of the shift produced by the moving mirror 33 on the spectrum pattern SP0.

1.6. Corner Cube Prism

Figure 8:
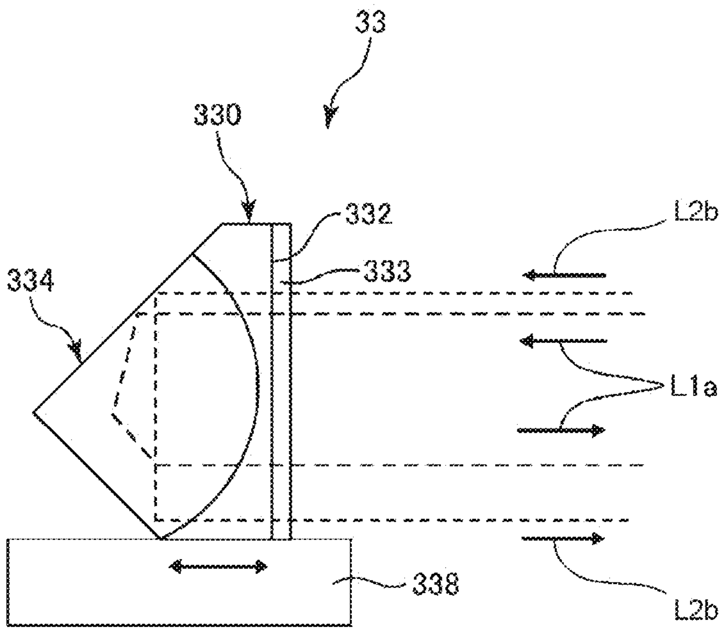
FIG. 8 is a side view showing an example of a corner cube prism in FIG. 1.
Figure 9:
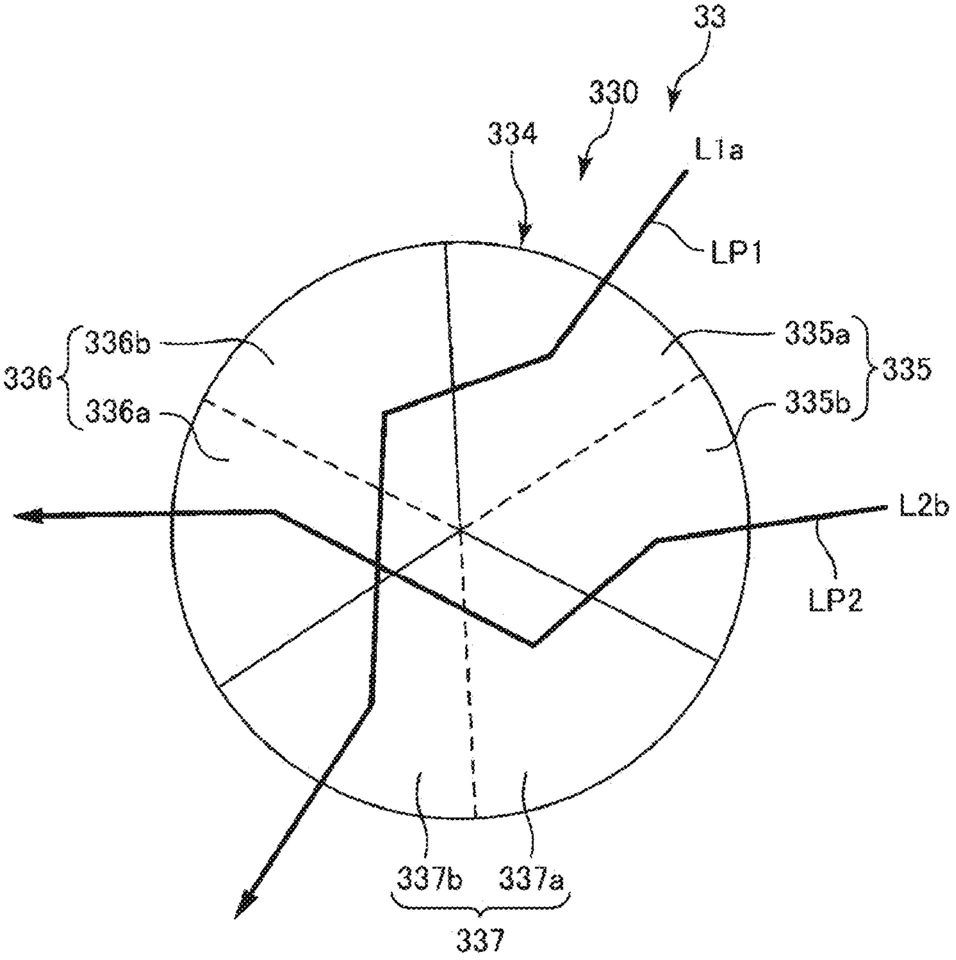
FIG. 9 is a plan view of a retroreflection surface in FIG. 8.

FIG. 8 is a side view showing an example of the corner cube prism 330 in FIG. 1. FIG. 9 is a plan view of a retroreflection surface 334 in FIG. 8. In FIGS. 8 and 9, paths of the incident light are indicated by arrows. The optical paths shown in FIG. 9 are simplified for convenience of illustration.

The corner cube prism 330 shown in FIG. 8 has a light incident surface 332 and the retroreflection surface 334. The light incident surface 332 faces the beam splitter 32 and is configured with a planar surface. When the light is incident on the light incident surface 332, the light enters the corner cube prism 330, is reflected off the retroreflection surface 334, and exits s via the light incident surface 332 again. The retroreflection surface 334 has three surfaces 335, 336, and 337 shown in FIG. 9. The three surfaces 335, 336, and 337 form the corner of the cube (cubic body), and cause the light to be internally reflected three times. The light having exited via the light incident surface 332 can thus return in the direction that is the same as the light incident direction.

For example, the corner cube prism 330 has retro-reflectivity not only when the angle of incidence of the light with respect to the light incident surface 332 is 0° but also when the angle of incidence is greater than 0°. In addition, only one member that constitutes the corner cube prism 330 can provide retro-reflectivity. Using the corner cube prism 330 therefore readily allows simplification, size reduction, weight reduction, and cost reduction of the moving mirror 33.

Consider the optical path formed inside the corner cube prism 330, the three surfaces 335, 336, and 337 shown in FIG. 9 are each divided into two regions. The surface 335 has regions 335*a* and 335*b*, the surface 336 has regions 336*a* and 336*b*, and the surface 337 has regions 337*a* and 337*b*. The light having entered the corner cube prism 330 is reflected off three regions out of the six regions and exits out of the corner cube prism 330. The corner cube prism 330 therefore forms three different optical paths. For example, the analysis light L1*a* enters via the light incident surface 332, is reflected off the regions 335*a*, 336*b*, and 337*b*, and travels along an optical path LP1, which extends via the light incident surface 332. The length measurement light L2*b* enters via the light incident surface 332, is reflected off the regions 335*b*, 337*a*, and 336*a*, and travels along an optical path LP2, which extends via the light incident surface 332. Causing the analysis light L1*a* and the length measurement light L2*b* to enter the corner cube 330 so as to follow different optical paths as described above allows the position where the analysis light L1*a* is reflected and the position where the length measurement light L2*b* is reflected to differ from each other even when the two kinds of light are reflected off the same retroreflection surface 334. Unintended mixture of the analysis light L1*a* and the length measurement light L2*b* (mutual signal leakage) can thus be suppressed. As a result, a decrease in the S/N ratio of the interference signal described above can be suppressed.

An antireflection film 333 is preferably provided at the light incident surface 332 of the corner cube prism 330. The light incidence efficiency at which the light (analysis light L1*a* and length measurement light L2*b*) is incident on the light incident surface 332 can thus be increased. The light exiting efficiency at which the light (analysis light L1*a* and length measurement light L2*b*) exits via the light incident surface 332 can also be increased. Furthermore, generation of reflected stray light at the light incident surface 332 can be suppressed, so that generation of noise due to the reflected stray light entering the first light receiver 36 can be suppressed. As a result, a decrease in the S/N ratio of the interference signal can be suppressed. The antireflection film 333 may, for example, be a dielectric multilayer film.

The corner cube prism 330 may instead be so configured that the light is totally internally reflected off the retroreflection surface 334. Specifically, to cause the internal total reflection, the retroreflection surface 334 may be configured as an interface with a low-refractive-index medium such as air. The reflectance of the retroreflection surface 334 can thus be sufficiently close to 100%, so that the reflection efficiency of the corner cube prism 330 can be increased.

The corner cube prism 330 may still instead be so configured that the light is specularly reflected off the retroreflection surface 334. Specifically, to cause the specular reflection, the retroreflection surface 334 may be configured as an interface with a high-refractive-index medium such as metal. The reflectance of the retroreflection surface 334 can thus be increased regardless of the angle of incidence with respect to the retroreflection surface 334. In addition, the specular reflection causes no dependence of the reflectance on polarization, so that loss due to the dependence of the reflectance on polarization can be suppressed. Examples of the high-refractive-index medium may include metals such as Al, Au, and Ag.

The moving mirror 33 includes a slider 338, at which the corner cube prism 330 described above is placed. The slider 338 shown in FIG. 8 supports the corner cube prism 330 and is driven by the driver 8. That is, the slider 338 only needs to have, for example, the function as a slider linearly driven along the linear guide provided in the driver 8 and the function as a housing that holds the corner cube prism 330 with the posture thereof unchanged. According to the configuration including the thus configured slider 338, providing a linear guide having a length necessary for the driver 8 can ensure a sufficiently long travel of the moving mirror 33. The wavelength resolution (wave number resolution) of an acquirable spectral pattern can thus be readily increased.

In the present embodiment, the retroreflection surface 334 is configured to reflect both the analysis light L1*a* and the length measurement light L2*b*, and the length measurement light L2*b* may be reflected off a reflection surface provided separately from the retroreflection surface 334 and having no retro-reflectivity.

2. Variation of First Embodiment

A variation of the first embodiment will next be described.

Figure 10:
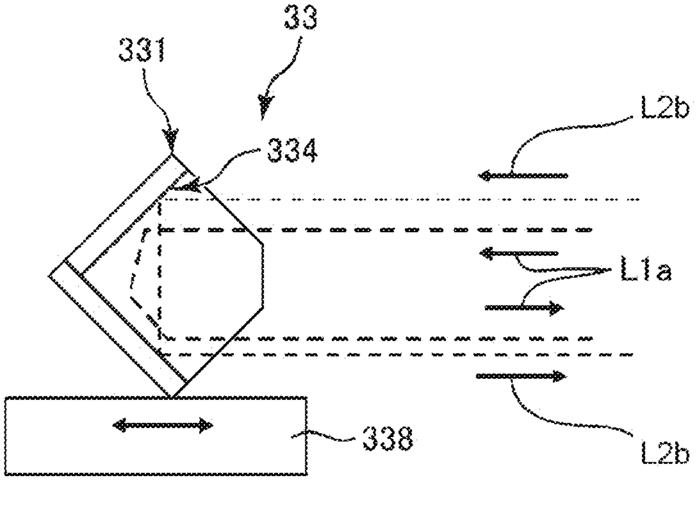
FIG. 10 is a side view showing a corner cube mirror provided as a moving mirror in a variation of the first embodiment.

FIG. 10 is a side view showing a corner cube mirror 331 provided as the moving mirror 33 in the variation of the first embodiment.

The variation of the first embodiment will be described below, and in the following description, differences from the first embodiment will be primarily described, and description of the same items will be omitted. In FIG. 10, the same elements as those in the first embodiment have the same reference characters.

The variation of the first embodiment is the same as the first embodiment except that the corner cube mirror 331 is provided in place of the corner cube prism 330 described above.

The moving mirror 33 shown in FIG. 10 includes the corner cube mirror 331. The corner cube mirror 331 is also called a hollow retroreflector, and has retro-reflectivity that is the same as that of the corner cube prism 330.

The corner cube mirror 331 shown in FIG. 10 also has the retroreflection surface 334. The retroreflection surface 334 includes three surfaces. The three surfaces form the corner of the cube (cubic body), and cause the light to be specularly reflected three times. The light having exited via the retroreflection surface 334 can thus return in the direction that is the same as the light incident direction.

Furthermore, since the corner cube mirror 331 has no light incident surface, optical loss that occurs when the light enters and exits out of the corner cube mirror 331 can be suppressed. Furthermore, the retroreflection surface 334 of the corner cube mirror 331 specularly reflects the light and therefore has no dependence of the reflectance on polarization, so that optical loss caused by the dependence of the reflectance on polarization can be suppressed. Using the corner cube mirror 331 can therefore further suppress a decrease in the S/N ratio of the interference signal.

It should be noted that the corner cube mirror 331 may be of any one of the following types: a mount type in which three mirrors are fixed to a mount member; a replica type in which a film made of a mirror material such as metal is formed at a replica member having three surfaces perpendicular to each other; and any other suitable type.

The variation described above can also provide effects that are the same as those provided by the first embodiment.

3. Second Embodiment

An interferometer according to a second embodiment will next be described.

Figure 11:
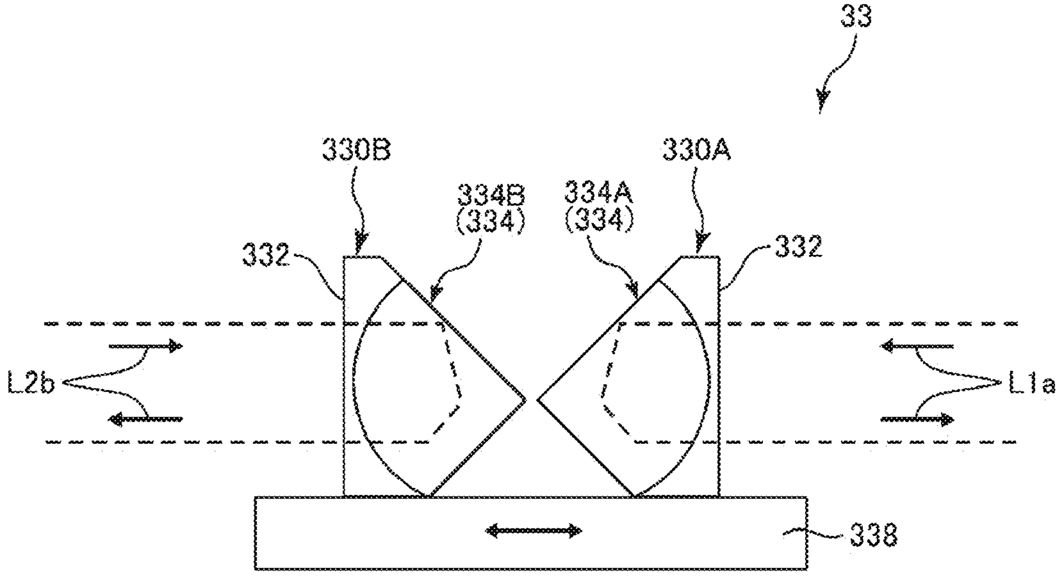
FIG. 11 is a side view showing corner cube prisms provided as the moving mirror in a second embodiment.

FIG. 11 is a side view showing corner cube prisms 330A and 330B provided as the moving mirror 33 in the second embodiment.

The second embodiment will be described below, and in the following description, differences from the first embodiment will be primarily described, and description of the same items will be omitted. In FIG. 11, items that are the same as those in the first embodiment have the same reference characters.

The second embodiment is the same as the first embodiment except for the configuration of the moving mirror 33 shown in FIG. 11.

The moving mirror 33 shown in FIG. 11 includes two corner cube prisms 330A and 330B. The corner cube prisms 330A and 330B are each an optical element that is the same as the corner cube prism 330 described above, and each have the light incident surface 332 and the retroreflection surface 334.

The two corner cube prisms 330A and 330B are arranged along the axis along which the moving mirror 33 is moved.

The retroreflection surface 334 of the corner cube prism 330A is also referred to as an "analysis light reflecting surface 334A". Unlike the retroreflection surface 334 in the first embodiment described above, the analysis light reflecting surface 334A reflects only the analysis light L1*a*. The retroreflection surface 334 of the corner cube prism 330B is also referred to as a "laser light reflecting surface 334B". The laser light reflecting surface 334B reflects only the length measurement light L2*b*. The moving mirror 33 shown in FIG. 11 is therefore so configured that the optical path of the analysis light L1*a* and the optical path of the length measurement light L2*b* are separate from each other, so that unintended mixture of the analysis light L1*a* and the length measurement light L2*b* can be prevented. In addition, since optical path adjustment for preventing mixture of the analysis light L1*a* and the length measurement light L2*b* is not necessary, the difficulty in assembling the analysis optical system 3 can be lowered.

The moving mirror 33 shown in FIG. 11 is further so configured that the analysis light reflecting surface 334A and the laser light reflecting surface 334B are disposed so as to face away from each other and are placed at the slider 338. The length measurement light L2*b* can therefore be caused to be incident on the moving mirror 33 without difficulty even when an optical element that bypasses the length measurement light L2*b*, specifically, the optical path changing mirrors 441 to 444 provided in the first embodiment are not provided. As a result, the configuration of the spectroscopic apparatus 100 is readily simplified.

The slider 338 shown in FIG. 11 includes a member that integrates the corner cube prisms 330A and 330B with each other. The corner cube prisms 330A and 330B can thus be driven as a unit. As a result, the movement of the corner cube prism 330A can be accurately detected by the length measurement light L2*b* reflected off the corner cube prism 330B, so that the accuracy of the final result of the analysis can be further increased.

The second embodiment described above can also provide effects that are the same as those provided by the first embodiment.

In the present embodiment, the laser light reflecting surface 334B has retro-reflectivity, and the laser light reflecting surface 334B may not necessarily have retro-reflectivity. Also in this case, the analysis optical system 3 can benefit from the effects described above. Furthermore, the configuration in which the laser light reflecting surface 334B has retro-reflectivity, as in the present embodiment, can suppress a decrease in the S/N ratio of the interference signal, which represents the interference between the length measurement light L2*a* and the length measurement light L2*b*, due to the shift thereof produced when the moving mirror 33 is moved. The position of the moving mirror 33 can therefore be detected more accurately.

4. Variation of Second Embodiment

A variation of the second embodiment will next be described.

Figure 12:
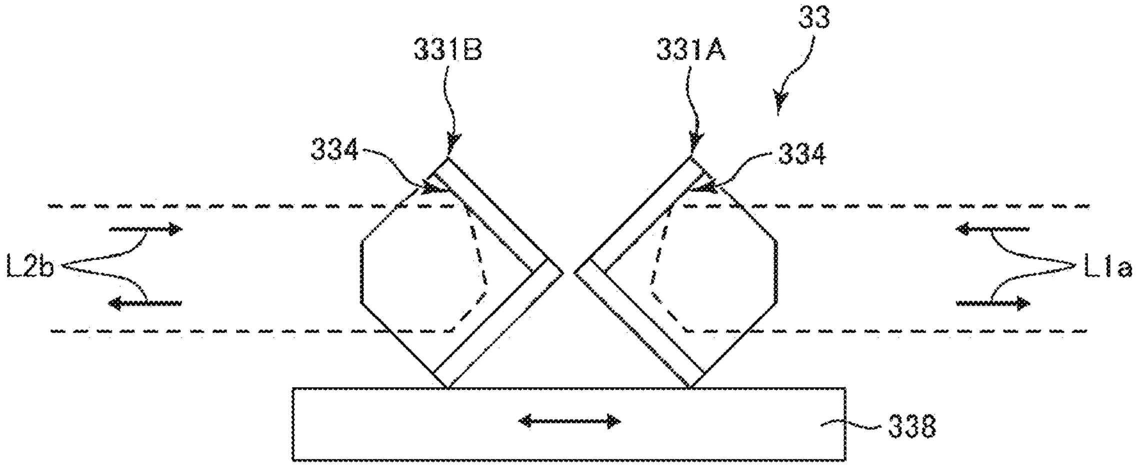
FIG. 12 is a side view showing corner cube mirrors provided as the moving mirror in a variation of the second embodiment.

FIG. 12 is a side view showing corner cube mirrors 331A and 331B provided as the moving mirror 33 in a variation of the second embodiment.

The variation of the second embodiment will be described below, and in the following description, differences from the second embodiment will be primarily described, and description of the same items will be omitted. In FIG. 12, the same elements as those in the second embodiment have the same reference characters.

The variation of the second embodiment is the same as the second embodiment except that the corner cube mirrors 331A and 331B are provided in place of the corner cube prisms 330A and 330B.

The moving mirror 33 shown in FIG. 12 includes the corner cube mirrors 331A and 331B. The corner cube mirrors 331A and 331B also each have the retroreflection surface 334. The light incident on each of the retroreflection surfaces 334 can thus return in the direction that is the same as the light incident direction.

Since the corner cube mirrors 331A and 331B each have no light incident surface, optical loss that occurs when the light enters and exits out of the corner cube mirror can be suppressed. Furthermore, the retroreflection surfaces 334 each specularly reflect the light and therefore has no dependence of the reflectance on polarization, so that optical loss caused by the dependence of the reflectance on polarization can be suppressed. Using the corner cube mirrors 331A and 331B can therefore further suppress unintended interference between the analysis light L1*a* and the length measurement light L2*b*.

It should be noted that the corner cube mirrors 331A and 331B may each be of the mount type, the replica type, or any other suitable type.

The variation described above can also provide effects that are the same as those provided by the second embodiment.

5. Third Embodiment

An interferometer according to a third embodiment will next be described.

Figure 13:
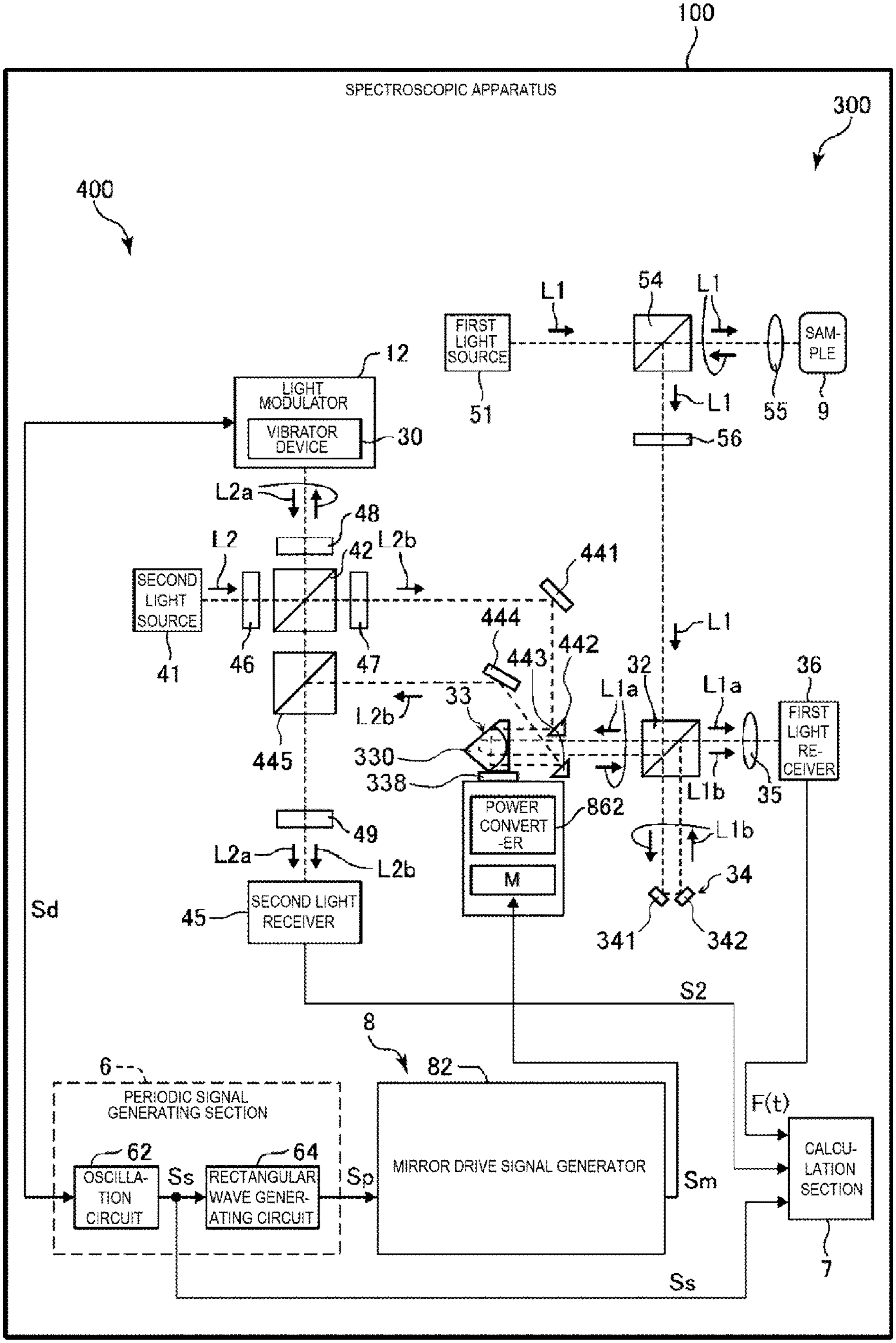
FIG. 13 is a schematic configuration diagram showing the spectroscopic apparatus as the interferometer according to a third embodiment.

FIG. 13 is a schematic configuration diagram showing the spectroscopic apparatus 100 as the interferometer according to the third embodiment.

The third embodiment will be described below, and in the following description, differences from the first embodiment will be primarily described, and description of the same items will be omitted. In FIG. 13, the same elements as those in the first embodiment have the same reference characters.

The third embodiment is the same as the first embodiment except for the configurations of the periodic signal generator 6 and the driver 8. Specifically, in the third embodiment, the periodic signal generating section 6 outputs not only the reference signal Ss but also a mirror drive signal Sm (reflector drive signal) used to drive the motor M provided in the driver 8. The third embodiment therefore eliminates the need for a periodic signal generating section necessary for generation of the mirror drive signal Sm. That is, the vibrator 30 is used not only as the signal source of the reference signal Ss but also as the signal source of the mirror drive signal Sm. As a result, the configuration of the spectroscopic apparatus 100 can be simplified, and the spectroscopic apparatus 100 can be reduced in terms of size, weight, power consumption, and cost.

The periodic signal generating section 6 shown in FIG. 13 includes the oscillation circuit 62 and a rectangular wave generating circuit 64. The rectangular wave generating circuit 64 converts the reference signal Ss, which is an analog signal output from the oscillation circuit 62, into a pulse signal Sp, which is a digital signal. The rectangular wave generating circuit 64 may, for example, be an analog-to-digital conversion circuit using a comparator.

The driver 8 shown in FIG. 13 includes the motor M, the power converter 862, and a mirror drive signal generator 82. The mirror drive signal generator 82 generates the mirror drive signal Sm having a target drive frequency based on the pulse signal Sp input from the periodic signal generating section 6. The mirror drive signal generator 82 then outputs the mirror drive signal Sm toward a stepper motor SPM to drive the moving mirror 33 via the power converter 862.

The third embodiment described above can also provide effects that are the same as those provided by the first embodiment.

6. Fourth Embodiment

An interferometer according to a fourth embodiment will next be described.

Figure 14:
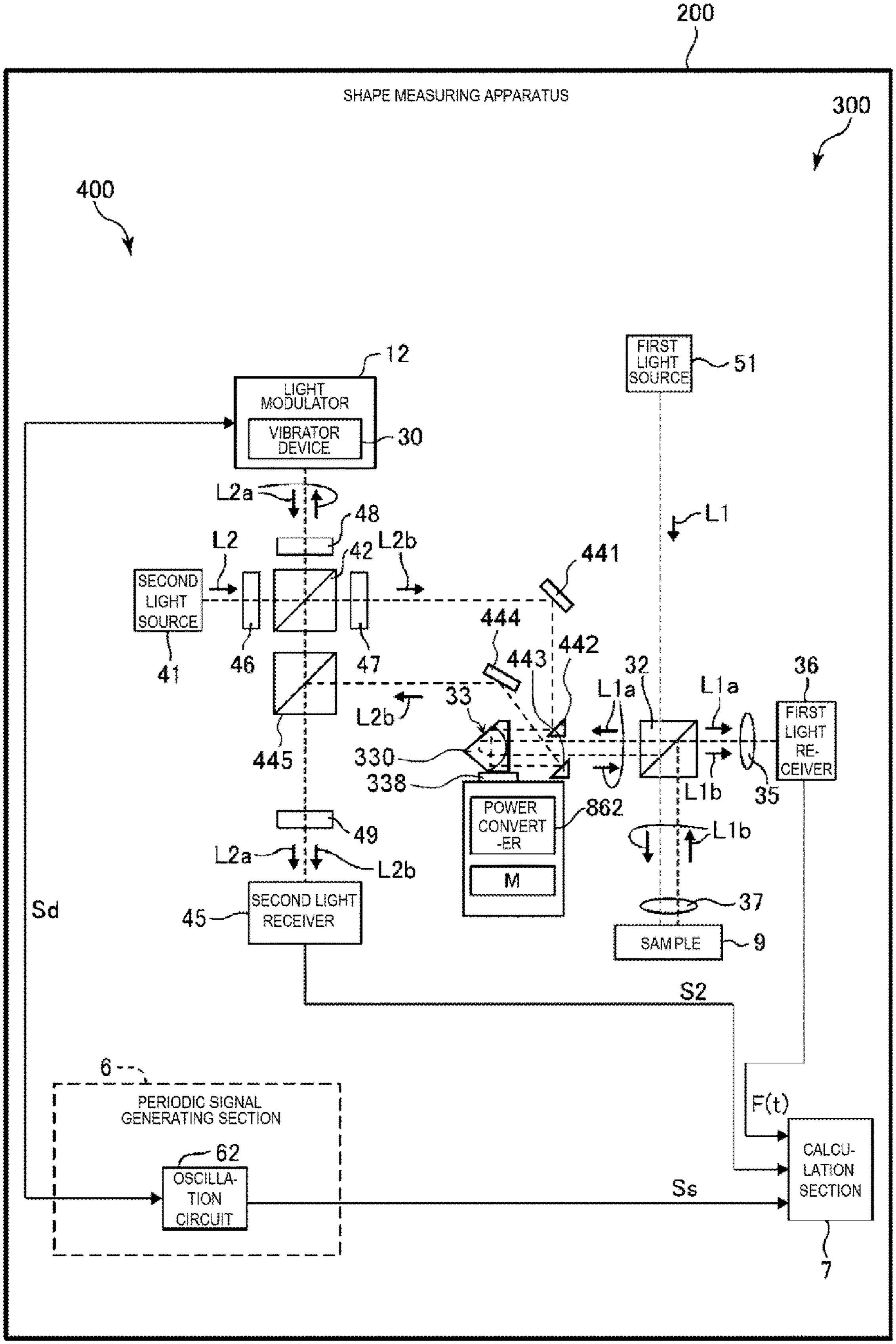
FIG. 14 is a schematic configuration diagram showing a shape measuring apparatus as the interferometer according to a fourth embodiment.
Figure 15:
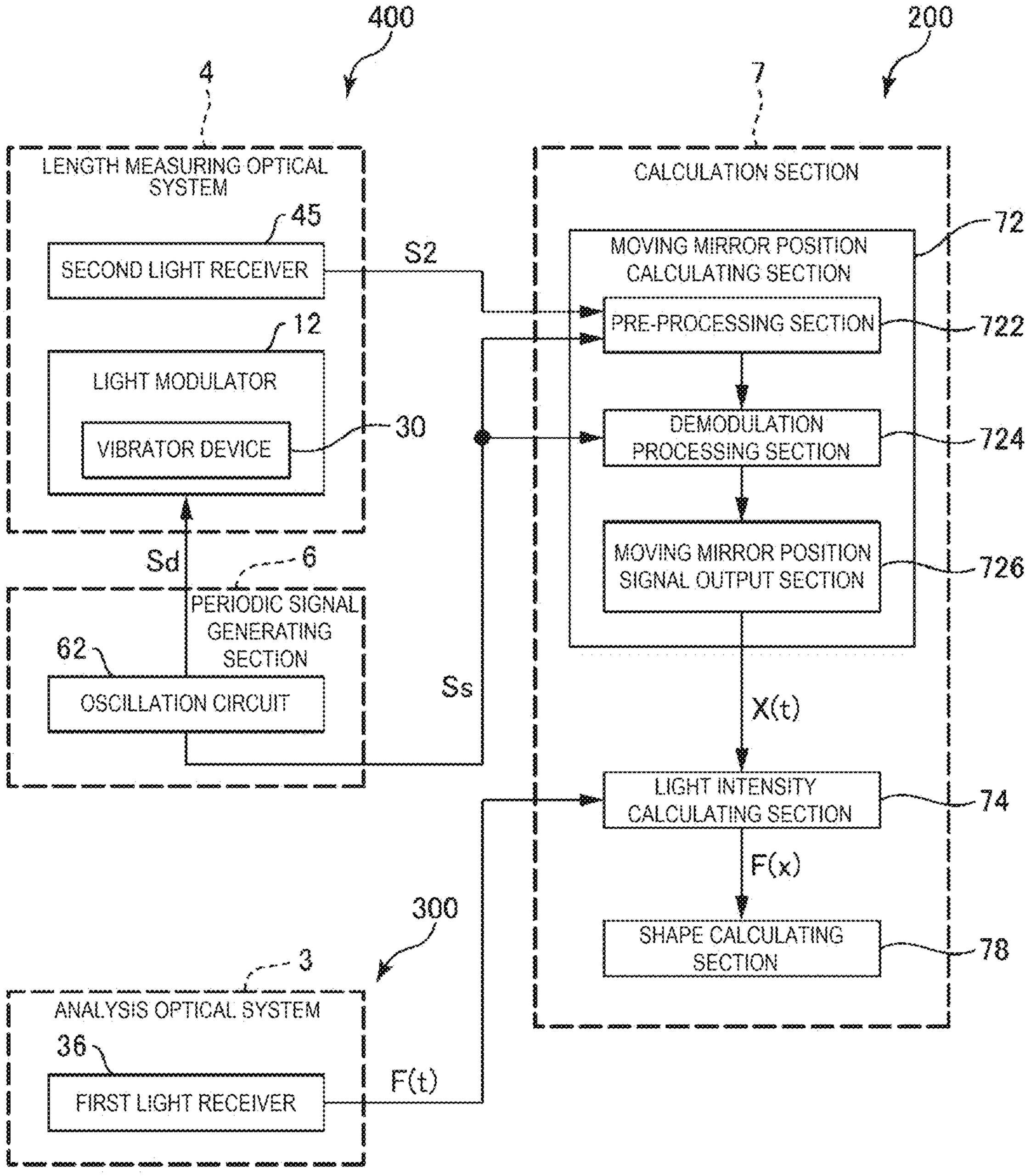
FIG. 15 is a schematic configuration diagram showing key parts of the analysis section, the length measuring section, the periodic signal generating section, and the calculation section in FIG. 14.

FIG. 14 is a schematic configuration diagram showing a shape measuring apparatus 200 as the interferometer according to the fourth embodiment. FIG. 15 is a schematic configuration diagram showing key parts of the analysis section 300, the length measuring section 400, the periodic signal generating section 6, and the calculation section 7 in FIG. 14.

The fourth embodiment will be described below, and in the following description, differences from the first embodiment will be primarily described, and description of the same items will be omitted. In FIGS. 14 and 15, items that are the same as those in the first embodiment have the same reference characters.

The spectroscopic apparatus 100 according to the first embodiment is an apparatus that irradiates the sample 9 with the analysis light L1 output from the first light source 51 and performs spectroscopic analysis on the sample 9. In contrast, the shape measuring apparatus 200 according to the fourth embodiment is an apparatus that irradiates the sample 9 with the analysis light L1 and measures the shapes of the surface and the interior of the sample 9. The shape measuring apparatus 200 shown in FIG. 14 is substantially the same as the spectroscopic apparatus 100 shown in FIG. 1 except for the configuration of the analysis optical system 3.

The analysis optical system 3 shown in FIG. 14 includes the first light source 51, the beam splitter 32, the moving mirror 33, the light collecting lens 35, a light collecting lens 37, and the first light receiver 36.

Examples of the first light source 51 shown in FIG. 14 may include a white light source such as a super luminescent diode (SLD) and a light emitting diode (LED), and a wavelength swept light source, as well as the variety of lamps described in the first embodiment. A broadband light source called a low-coherence light source is preferably used as the first light source 51.

The analysis light L1 output from the first light source 51 is split by the beam splitter 32 into two parts. The beam splitter 32 shown in FIG. 14 reflects part of the analysis light L1 as the analysis light L1*a* toward the moving mirror 33 and transmits the other part of the analysis light L1 as the analysis light L1*b* toward the sample 9. The analysis light Lib is collected by the light collecting lens 37 and radiated to the sample 9.

In addition, the beam splitter 32 transmits the analysis light L1*a* reflected off the moving mirror 33 toward the first light receiver 36, and reflects the analysis light L1*b* reflected off the sample 9 toward the first light receiver 36. The beam splitter 32 therefore mixes the analysis light L1*a* and the analysis light L1*b*, into which the analysis light L1 has been split, with each other into the interference light.

The first light receiver 36 receives the interference light and acquires the intensity thereof. A signal indicating a temporal change in the intensity is output as a first light reception signal F(t). The first light reception signal F(t) contains a sample derived component generated by the interaction between the analysis light L1*b* and the sample 9 and the phase information derived from the moving mirror 33 described above. The sample derived component is, for example, a change in phase added to the analysis light L1*b* in accordance with the shape of the surface of the sample 9.

Examples of the first light receiver 36 may include a photodiode, a phototransistor, and an image sensor such as a charge coupled device (CCD) and a complementary metal oxide semiconductor (CMOS). Using the image sensor allows acquisition of a two-dimensional distribution of the first light reception signal F(t). The two-dimensional shape of the surface of the sample 9 can thus be measured.

The length measuring optical system 4, the periodic signal generating section 6, and the driver 8 shown in FIG. 14 are the same as those in FIG. 1.

The calculation section 7 shown in FIG. 15 includes the moving mirror position calculating section 72, the light intensity calculating section 74, and a shape calculating section 78.

The light intensity calculating section 74 shown in FIG. 15 generates a waveform representing the intensity of the first light reception signal F(t) (interferogram F(x)) at each position of the moving mirror 33 based on the first light reception signal F(t) and the moving mirror position signal X(t), as in the first embodiment. The shape calculating section 78 shown in FIG. 15 calculates the shape of the surface of the sample 9 based on the waveform. Specific analysis methods are known under names such as white light interference measurement method and time domain optical coherence tomography (OCT).

Note that FIG. 14 shows the case where the sample 9 reflects the analysis light L1*b*, and when the sample 9 transmits the analysis light L1*b*, the shape measuring apparatus 200 shown in FIG. 14 can measure the shape of the interior (internal structure) of the sample 9. A specific analysis method is known, for example, under the name of optical coherence tomography.

The fourth embodiment described above can also provide effects that are the same as those provided by the first embodiment.

7. Effects Provided by Embodiments Described Above

The interferometer (spectroscopic apparatus 100 or shape measuring apparatus 200) according to each of the embodiments described above includes the analysis optical system 3, the length measuring optical system 4, and the driver 8. The analysis optical system 3 includes the moving mirror 33 (retroreflector) and the first light receiver 36. The moving mirror 33 reflects the analysis light L1*a*. The first light receiver 36 receives the analysis light L1*a* and the analysis light L1*b* and outputs the first light reception signal. The analysis optical system 3 then irradiates the sample 9 with the analysis light L1 and causes the analysis light L1*a* and the analysis light L1*b* to interfere with each other. The length measuring optical system 4 includes the second light source 41 (laser light source), the light modulator 12, and the second light receiver 45. The second light source 41 outputs the length measurement light L2 (laser light). The light modulator 12 modulates the frequency of the length measurement light L2*a* with the aid of the vibrator 30 and adds the modulation component to the length measurement light L2*a*. The second light receiver 45 receives the length measurement light L2*a* containing the length measurement component generated when the moving mirror 33 is irradiated with the length measurement light L2*b* and the length measurement light L2*b* containing the modulation component, and then outputs the second light reception signal S2. The length measuring optical system 4 then causes the length measurement light L2*a* and the length measurement light L2*b* to interfere with each other. The driver 8 changes the position of the moving mirror 33.

The configuration described above, in which the moving mirror 33 has retro-reflectivity, can suppress a decrease in the S/N ratio of the interference signal representing the interference between the analysis light L1*a* and the analysis light L1*b* due to a shift thereof produced when the moving mirror 33 is moved (when position of moving mirror 33 is changed). In addition, since the moving mirror 33 has retro-reflectivity, the tolerance of the shift produced when the moving mirror 33 is moved can be increased, so that a decrease in the S/N ratio of the interference signal is readily suppressed even when the accuracy at which the driver 8 drives the moving mirror 33 is lowered. An increase in size of the driver 8 is thus suppressed, so that the size, weight, and cost of the interferometer can be reduced.

In the interferometer (spectroscopic apparatus 100 or shape measuring apparatus 200) according to each of the embodiments described above, the moving mirror 33 (retroreflector) includes the retroreflection surface 334 and the slider 338. The retroreflection surface 334 has retro-reflectivity and reflects the analysis light L1*a* and the length measurement light L2*b* (laser light). The retroreflection surface 334 is placed at the slider 338, and the slider 338 is driven by the driver 8.

The configuration described above can secure a sufficiently long travel of the moving mirror 33, and can readily increase the wavelength resolution (wave number resolution) of an acquirable spectrum pattern.

In the interferometer (spectroscopic apparatus 100 or shape measuring apparatus 200) according to each of the embodiments described above, the position where the analysis light L1*a* is reflected at the retroreflection surface 334 and the position where the length measurement light L2*b* (laser light) is reflected at the retroreflection surface 334 differ from each other.

According to the configuration described above, interference between the analysis light L1*a* and the length measurement light L2*b* can be suppressed. As a result, a decrease in the S/N ratio of the length measurement component and the sample derived component can be suppressed.

In the interferometer (spectroscopic apparatus 100 or shape measuring apparatus 200) according to each of the embodiments described above, the moving mirror 33 (retroreflector) has the analysis light reflecting surface 334A, the laser light reflecting surface 334B, and the slider 338.

The analysis light reflecting surface 334A has retro-reflectivity and reflects the analysis light L1*a*. The laser light reflecting surface 334B reflects the length measurement light L2*b* (laser light). The analysis light reflecting surface 334A and the laser light reflecting surface 334B are placed at the slider 338, and the slider 338 is driven by the driver 8.

According to the configuration described above, since the analysis light reflecting surface 334A reflects only the analysis light L1*a* and the laser light reflecting surface 334B reflects only the length measurement light L2*b*, the optical path of the analysis light L1*a* and the optical path of the length measurement light L2*b* can be separate from each other, so that unintended mixture of the analysis light L1*a* and the length measurement light L2*b* can be avoided.

In the interferometer (spectroscopic apparatus 100 or shape measuring apparatus 200) according to each of the embodiments described above, the laser light reflecting surface 334B has retro-reflectivity.

The configuration described above can suppress a decrease in the S/N ratio of the interference signal representing the interference between the length measurement light L2*a* and the length measurement light L2*b* due to a shift thereof produced when the moving mirror 33 is moved (when position of moving mirror 33 is changed).

In the interferometer (spectroscopic apparatus 100 or shape measuring apparatus 200) according to each of the embodiments described above, the analysis light reflecting surface 334A and the laser light reflecting surface 334B face away from each other.

The configuration described above allows the length measurement light L2*b* to be incident on the moving mirror 33 without difficulty even when there is no optical element that bypasses the length measurement light L2*b*. As a result, the configuration of the interferometer is readily simplified.

In the interferometer (spectroscopic apparatus 100 or shape measuring apparatus 200) according to each of the embodiments described above, the driver 8 drives the moving mirror 33 (retroreflector) based on the mirror drive signal Sm (reflector drive signal). In this case, the vibrator 30 may be a signal source of the mirror drive signal Sm.

The configuration described above can simplify the configuration of the interferometer, so that the interferometer can be reduced in terms of size, weight, power consumption, and cost.

In the interferometer (spectroscopic apparatus 100 or shape measuring apparatus 200) according to each of the embodiments described above, the analysis optical system 3 includes the beam splitter 32 (light divider), the moving mirror 33 (retroreflector), and the fixed mirror 34 (fixed reflector). The beam splitter 32 splits the analysis light L1 into two parts, and mixes the analysis light L1*a* and the analysis light L1*b*, into which the analysis light L1 has been split, with each other. The moving mirror 33 reflects one of the two parts (analysis light L1*a*), into which the analysis light L1 has been split, toward the beam splitter 32. The fixed mirror 34 reflects the other of the two parts (analysis light L1*b*), into which the analysis light L1 has been split, toward the beam splitter 32. The fixed mirror 34 may have retro-reflectivity.

The configuration described above can suppress a decrease in the S/N ratio of the interference signal due to an angular deviation (angle of deflection) of the arrangement of the fixed mirror 34.

In the interferometer (spectroscopic apparatus 100 or shape measuring apparatus 200) according to each of the embodiments described above, the moving mirror 33 (retroreflector) may include the corner cube prism 330.

The configuration described above, in which one member (corner cube prism 330) allows the moving mirror 33 to have retro-reflectivity, readily allows simplification, size reduction, weight reduction, and cost reduction of the moving mirror 33.

In the interferometer (spectroscopic apparatus 100 or shape measuring apparatus 200) according to each of the embodiments described above, the moving mirror 33 (retroreflector) may have the antireflection film 333 provided at the light incident surface 332 of the corner cube prism 330.

The configuration described above can increase the light incidence efficiency at which the light (analysis light L1*a* and length measurement light L2*b*) is incident on the light incident surface 332. The light exiting efficiency at which the light (analysis light L1*a* and length measurement light L2*b*) exits via the light incident surface 332 can also be increased. Furthermore, generation of reflected stray light at the light incident surface 332 can be suppressed, so that generation of noise due to the reflected stray light entering the first light receiver 36 can be suppressed. As a result, a decrease in the S/N ratio of each of the length measurement component and the sample derived component can be suppressed.

In the interferometer (spectroscopic apparatus 100 or shape measuring apparatus 200) according to each of the above embodiments described above, the moving mirror 33 (retroreflector) may include the corner cube mirror 331.

The configuration described above, in which the corner cube mirror 331 has no light incident surface, can suppress optical loss that occurs when the light enters and exits out of the corner cube mirror 331. In addition, the retroreflection surface 334 of the corner cube mirror 331 specularly reflects the light, and therefore has no dependence of the reflectance on polarization, so that optical loss caused by the dependence of the reflectance on polarization can be suppressed.

As described above, the interferometer according to the present disclosure has been described based on the illustrated embodiments, the interferometer according to the present disclosure is not necessarily configured in accordance with any of the embodiments, and the configuration of each section of the interferometer may be replaced with any configuration, or any other configuration may be added to the interferometer.

Furthermore, the interferometer according to the present disclosure may include two or more of the embodiments described above and the variations thereof. Moreover, the functional sections provided in the interferometer according to the present disclosure may be divided into multiple elements, or multiple functional sections may be integrated into one.

A Michelson interference optical system is used in the embodiments described above, and other types of interference optical systems may be used.

Furthermore, the arrangement of the sample is not limited to the arrangement shown in the drawings. Since the sample derived component is generated by causing the analysis light to act on the sample, the sample can be disposed at any position where the analysis light output from the sample can be incident on the first light receiver.

What is claimed is:

1. An interferometer comprising:

a first beam splitter configured to divide first analysis light into second analysis light and third analysis light, the third analysis light acting on a sample to generate fourth analysis light containing a sample derived component;

a retroreflector configured to reflect the second analysis light to generate fifth analysis light;

a first photodiode configured to receive first interference light and output a first light reception signal, the first interference light being a mixture of the fourth analysis light and the fifth analysis light;

a laser light source configured to output first laser light;

a second beam splitter configured to divide the first laser light into second laser light and third laser light, the third laser light irradiating the retroreflector to generate fourth laser light containing a length measurement component;

an optical modulator having a vibrator and configured to modulate a frequency of the second laser light to generate fifth laser light by using the vibrator and adding a modulation component to the second laser light;

a second photodiode configured to receive second interference light and output a second light reception signal, the second interference light being a mixture of the fourth laser light and the fifth laser light;

a driver including a motor and configured to change a position of the retroreflector by a rotational output from the motor; and a processor configured to generate a position signal indicating a position of the retroreflector based on the second light reception signal and generate an interferogram based on the first light reception signal and the position signal, wherein the first beam splitter mixes the fourth analysis light and the fifth analysis light to generate the first interference light.

2. The interferometer according to claim 1, further comprising:

a slider at which the retroreflector is placed and which is driven by the driver, wherein the retroreflector has a retroreflection surface placed at the slider and that has retro-reflectivity and reflects the second analysis light and the third laser light.

3. The interferometer according to claim 2, wherein a position where the second analysis light is reflected at the retroreflection surface and a position where the third laser light is reflected at the retroreflection surface differ from each other.

4. The interferometer according to claim 1, further comprising:

a slider at which the retroreflector is placed and which is driven by the driver, wherein the retroreflector has an analysis light reflecting surface that has retro-reflectivity and reflects the second analysis light, and a laser light reflecting surface that reflects the third laser light, and the analysis light reflecting surface and the laser light reflecting surface are placed at the slider.

5. The interferometer according to claim 4, wherein the laser light reflecting surface has retro-reflectivity.

6. The interferometer according to claim 4, wherein the analysis light reflecting surface and the laser light reflecting surface face away from each other.

7. The interferometer according to claim 1, wherein the driver drives the retroreflector based on a reflector drive signal, and the vibrator is a signal source of the reflector drive signal.

8. The interferometer according to claim 1, wherein the retroreflector includes a corner cube prism.

9. The interferometer according to claim 8, wherein the retroreflector includes an antireflection film provided at a light incident surface of the corner cube prism.

10. The interferometer according to claim 1, wherein the retroreflector includes a corner cube mirror.

11. The interferometer according to claim 7, further comprising:

an oscillation circuit configured to generate a reference signal using the vibrator as a signal source, wherein the driver further includes a mirror drive signal generator configured to output the reflector drive signal based on the reference signal, and changes the position of the retroreflector by the rotational output from the motor based on the reflector drive signal.

* * * * *